United States Patent
Weingarten et al.

(10) Patent No.: US 12,026,257 B2
(45) Date of Patent: *Jul. 2, 2024

(54) METHOD OF MALWARE DETECTION AND SYSTEM THEREOF

(71) Applicant: Sentinel Labs Israel Ltd., Tel Aviv (IL)

(72) Inventors: Tomer Weingarten, Petah Tikva (IL); Almog Cohen, Tel Aviv (IL); Udi Shamir, Rehovot (IL); Kirill Motil, Petah Tikva (IL)

(73) Assignee: Sentinel Labs Israel Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,711

(22) Filed: Mar. 7, 2023

(65) Prior Publication Data

US 2023/0281311 A1 Sep. 7, 2023

Related U.S. Application Data

(63) Continuation of application No. 16/849,808, filed on Apr. 15, 2020, now Pat. No. 11,625,485, which is a continuation of application No. 15/623,669, filed on Jun. 15, 2017, now Pat. No. 10,664,596, which is a continuation of application No. 14/456,127, filed on Aug. 11, 2014, now Pat. No. 9,710,648.

(51) Int. Cl.
*G06F 21/56* (2013.01)

(52) U.S. Cl.
CPC ........... *G06F 21/566* (2013.01); *G06F 21/56* (2013.01)

(58) Field of Classification Search
CPC .............................. G06F 21/566; G06F 21/56
See application file for complete search history.

(56) References Cited

U.S. PATENT DOCUMENTS

| | | |
|---|---|---|
| 4,979,118 A | 12/1990 | Kheradpir |
| 5,311,593 A | 5/1994 | Carmi |
| 6,154,844 A | 11/2000 | Touboul et al. |
| 6,157,953 A | 12/2000 | Chang et al. |
| 6,728,716 B1 | 4/2004 | Bhattacharya et al. |

(Continued)

FOREIGN PATENT DOCUMENTS

| | | |
|---|---|---|
| CN | 103607399 A | 2/2014 |
| EP | 3 171 568 | 5/2017 |

(Continued)

OTHER PUBLICATIONS

Barbhuiya et al., "Detection of neighbor solicitation and advertisement spoofing in IPv6 neighbor discovery protocol." Proceedings of the 4th international conference on Security of information and networks. (2011).

(Continued)

*Primary Examiner* — Victor Lesniewski
(74) *Attorney, Agent, or Firm* — Perkins Coie LLP

(57) ABSTRACT

There is provided a system and a computer-implemented method of detecting malware in real time in a live environment. The method comprises: monitoring one or more operations of at least one program concurrently running in the live environment, building at least one stateful model in accordance with the one or more operations, analyzing the at least one stateful model to identify one or more behaviors, and determining the presence of malware based on the identified one or more behaviors.

20 Claims, 5 Drawing Sheets

(56) References Cited

U.S. PATENT DOCUMENTS

| | | |
|---|---|---|
| 6,804,780 B1 | 10/2004 | Touboul |
| 6,836,888 B1 | 12/2004 | Basu et al. |
| 7,076,696 B1 | 7/2006 | Stringer |
| 7,093,239 B1 | 8/2006 | van der Made |
| 7,181,769 B1 | 2/2007 | Keanini et al. |
| 7,225,468 B2 | 5/2007 | Waisman et al. |
| 7,299,294 B1 | 11/2007 | Bruck et al. |
| 7,305,546 B1 | 12/2007 | Miller |
| 7,322,044 B2 | 1/2008 | Hrastar |
| 7,464,407 B2 | 12/2008 | Nakae et al. |
| 7,530,106 B1 | 5/2009 | Zaitsev et al. |
| 7,543,269 B2 | 6/2009 | Krueger |
| 7,546,587 B2 | 6/2009 | Marr et al. |
| 7,574,740 B1 | 8/2009 | Kennis |
| 7,596,807 B2 | 9/2009 | Ptacek et al. |
| 7,596,808 B1 | 9/2009 | Wilkinson et al. |
| 7,710,933 B1 | 5/2010 | Sundaralingam et al. |
| 7,739,516 B2 | 6/2010 | Bender et al. |
| 7,832,012 B2 | 11/2010 | Huddleston |
| 7,882,538 B1 | 2/2011 | Palmer |
| 7,890,612 B2 | 2/2011 | Todd et al. |
| 7,937,755 B1 | 5/2011 | Guruswamy |
| 7,984,129 B2 | 7/2011 | Vaught |
| 8,015,605 B2 | 9/2011 | Yegneswaran |
| 8,024,795 B2 | 9/2011 | Newton |
| 8,042,186 B1 | 10/2011 | Polyakov et al. |
| 8,065,722 B2 | 11/2011 | Barford et al. |
| 8,078,556 B2 | 12/2011 | Adi et al. |
| 8,082,471 B2 | 12/2011 | Khan |
| 8,131,281 B1 | 3/2012 | Hildner et al. |
| 8,141,154 B2 | 3/2012 | Gruzman et al. |
| 8,156,556 B2 | 4/2012 | Krishnamurthy |
| 8,171,545 B1 | 5/2012 | Cooley et al. |
| 8,181,033 B1 | 5/2012 | Paul et al. |
| 8,181,250 B2 | 5/2012 | Rafalovich et al. |
| 8,204,984 B1 | 6/2012 | Aziz |
| 8,205,035 B2 | 6/2012 | Reddy et al. |
| 8,230,505 B1 | 7/2012 | Ahrens et al. |
| 8,296,842 B2 | 10/2012 | Singh et al. |
| 8,327,442 B2 | 12/2012 | Herz et al. |
| 8,353,033 B1 | 1/2013 | Chen et al. |
| 8,370,931 B1 | 2/2013 | Chien et al. |
| 8,375,444 B2 | 2/2013 | Aziz et al. |
| 8,375,447 B2 | 2/2013 | Amoroso et al. |
| 8,413,238 B1 | 4/2013 | Sutton |
| 8,413,241 B2 | 4/2013 | Weeks et al. |
| 8,418,250 B2 | 4/2013 | Morris et al. |
| 8,438,386 B2 | 5/2013 | Hegli et al. |
| 8,438,626 B2 | 5/2013 | Anderson et al. |
| 8,443,442 B2 | 5/2013 | Wang et al. |
| 8,474,044 B2 | 6/2013 | Zawadowskiy et al. |
| 8,488,466 B2 | 7/2013 | Breslin et al. |
| 8,528,057 B1 | 9/2013 | Garrett |
| 8,528,087 B2 | 9/2013 | Hsu et al. |
| 8,538,578 B2 | 9/2013 | Battles et al. |
| 8,539,582 B1 | 9/2013 | Aziz et al. |
| 8,549,643 B1 | 10/2013 | Shou |
| 8,555,385 B1 | 10/2013 | Bhatkar et al. |
| 8,561,177 B1 | 10/2013 | Aziz et al. |
| 8,566,946 B1 | 10/2013 | Aziz et al. |
| 8,607,054 B2 | 12/2013 | Ramarathinam et al. |
| 8,607,340 B2 | 12/2013 | Wright |
| 8,627,475 B2 | 1/2014 | Loveland et al. |
| 8,677,494 B2 | 3/2014 | Edery et al. |
| 8,713,306 B1 | 4/2014 | Bennett |
| 8,719,937 B2 | 5/2014 | Sundaram et al. |
| 8,725,898 B1 | 5/2014 | Vincent |
| 8,726,389 B2 | 5/2014 | Morris et al. |
| 8,732,296 B1 | 5/2014 | Thomas et al. |
| 8,752,173 B2 | 6/2014 | Yadav |
| 8,789,135 B1 | 7/2014 | Pani |
| 8,793,151 B2 | 7/2014 | Delzoppo et al. |
| 8,821,242 B2 | 9/2014 | Hinman et al. |
| 8,839,369 B1 | 9/2014 | Dai et al. |
| 8,849,880 B2 | 9/2014 | Thelen |
| 8,850,582 B2 | 9/2014 | Endoh et al. |
| 8,880,435 B1 | 11/2014 | Catlett et al. |
| 8,881,282 B1 | 11/2014 | Aziz et al. |
| 8,893,278 B1 | 11/2014 | Chechik |
| 8,898,788 B1 | 11/2014 | Aziz et al. |
| 8,904,527 B2 | 12/2014 | Dawson et al. |
| 8,943,594 B1 | 1/2015 | Arrowood |
| 8,949,986 B2 | 2/2015 | Ben-Shalom |
| 8,959,338 B2 | 2/2015 | Snow et al. |
| 8,973,142 B2 | 3/2015 | Shulman et al. |
| 8,984,637 B2 | 3/2015 | Karecha et al. |
| 9,009,829 B2 | 4/2015 | Stolfo et al. |
| 9,027,135 B1 | 5/2015 | Aziz |
| 9,043,920 B2 | 5/2015 | Gula et al. |
| 9,081,747 B1 | 7/2015 | Tabieros et al. |
| 9,117,078 B1 | 8/2015 | Chien et al. |
| 9,141,792 B2 | 9/2015 | Baluda et al. |
| 9,166,993 B1 | 10/2015 | Liu |
| 9,185,136 B2 | 11/2015 | Dulkin et al. |
| 9,195,480 B2 | 11/2015 | Wang et al. |
| 9,197,601 B2 | 11/2015 | Pasdar |
| 9,213,838 B2 | 12/2015 | Lu |
| 9,225,734 B1 | 12/2015 | Hastings |
| 9,240,976 B1 | 1/2016 | Murchison |
| 9,246,774 B2 | 1/2016 | Mataitis et al. |
| 9,270,690 B2 | 2/2016 | Kraitsman et al. |
| 9,305,165 B2 | 4/2016 | Snow et al. |
| 9,329,973 B2 | 5/2016 | Bhuyan |
| 9,330,259 B2 | 5/2016 | Klein et al. |
| 9,356,942 B1 | 5/2016 | Joffe |
| 9,356,950 B2 | 5/2016 | Vissamsetty et al. |
| 9,369,476 B2 | 6/2016 | Chekina et al. |
| 9,386,034 B2 | 7/2016 | Cochenour |
| 9,398,001 B1 | 7/2016 | Tidd |
| 9,407,602 B2 | 7/2016 | Feghali et al. |
| 9,413,721 B2 | 8/2016 | Morris et al. |
| 9,430,646 B1 | 8/2016 | Mushtaq et al. |
| 9,432,360 B1 | 8/2016 | Triandopoulos et al. |
| 9,438,614 B2 | 9/2016 | Herz |
| 9,495,188 B1 | 11/2016 | Ettema et al. |
| 9,503,470 B2 | 11/2016 | Gertner et al. |
| 9,547,516 B2 | 1/2017 | Thakkar et al. |
| 9,578,045 B2 | 2/2017 | Jaroch et al. |
| 9,591,006 B2 | 3/2017 | Siva et al. |
| 9,601,000 B1 | 3/2017 | Gruss et al. |
| 9,602,531 B1 | 3/2017 | Wallace et al. |
| 9,606,893 B2 | 3/2017 | Gupta et al. |
| 9,607,146 B2 | 3/2017 | Sridhara et al. |
| 9,609,019 B2 | 3/2017 | Vissamsetty et al. |
| 9,628,498 B1 | 4/2017 | Aziz et al. |
| 9,641,544 B1 | 5/2017 | Treat et al. |
| 9,641,550 B2 | 5/2017 | Kraitsman et al. |
| 9,705,904 B1 | 7/2017 | Davis et al. |
| 9,710,648 B2 | 7/2017 | Weingarten |
| 9,712,547 B2 | 7/2017 | Touboul et al. |
| 9,769,204 B2 | 8/2017 | Vissamsetty et al. |
| 9,772,832 B2 | 9/2017 | Rubio |
| 9,781,148 B2 | 10/2017 | Mahaffey et al. |
| 9,807,092 B1 | 10/2017 | Gutzmann |
| 9,807,115 B2 | 10/2017 | Kolton et al. |
| 9,813,451 B2 | 11/2017 | Honda et al. |
| 9,871,766 B2 | 1/2018 | Syed et al. |
| 9,877,210 B1 | 1/2018 | Hildner et al. |
| 9,888,032 B2 | 2/2018 | Dekel et al. |
| 9,898,763 B1 | 2/2018 | Vaynblat et al. |
| 9,942,270 B2 | 3/2018 | Vissamsetty et al. |
| 10,025,928 B2 | 7/2018 | Jaroch et al. |
| 10,044,675 B1 | 8/2018 | Ettema et al. |
| 10,102,374 B1 | 10/2018 | Cohen et al. |
| 10,169,586 B2 | 1/2019 | Maciejak et al. |
| 10,237,282 B2 | 3/2019 | Nelson et al. |
| 10,250,636 B2 | 4/2019 | Vissamsetty et al. |
| 10,257,224 B2 | 4/2019 | Jaroch et al. |
| 10,284,591 B2 | 5/2019 | Giuliani et al. |
| 10,375,110 B2 | 7/2019 | Vissamsetty et al. |
| 10,382,484 B2 | 8/2019 | Shayevitz et al. |
| 10,476,891 B2 | 11/2019 | Vissamsetty et al. |
| 10,509,905 B2 | 12/2019 | Vissamsetty et al. |
| 10,542,044 B2 | 1/2020 | Vissamsetty et al. |

(56) References Cited

U.S. PATENT DOCUMENTS

| | | |
|---|---|---|
| 10,567,431 B2 | 1/2020 | Vissamsetty et al. |
| 10,574,698 B1 | 2/2020 | Sharifi |
| 10,599,842 B2 | 3/2020 | Vissamsetty et al. |
| 10,599,844 B2 | 3/2020 | Schmidtler et al. |
| 10,609,074 B2 | 3/2020 | Vissamsetty et al. |
| 10,757,090 B2 | 8/2020 | Kahol et al. |
| 10,826,941 B2 | 11/2020 | Jain et al. |
| 10,855,671 B2 | 12/2020 | Kahol et al. |
| 10,938,854 B2 | 3/2021 | Strogov et al. |
| 11,032,301 B2 | 6/2021 | Mandrychenko et al. |
| 11,038,658 B2 | 6/2021 | Vissamsetty et al. |
| 11,171,974 B2 | 11/2021 | Gertner et al. |
| 11,470,115 B2 | 10/2022 | Vissamsetty et al. |
| 11,507,663 B2 | 11/2022 | Cohen et al. |
| 11,522,894 B2 | 12/2022 | Weingarten et al. |
| 11,579,857 B2 | 2/2023 | Montag et al. |
| 11,580,218 B2 | 2/2023 | Enfinger |
| 2002/0010800 A1 | 1/2002 | Riley et al. |
| 2002/0016826 A1 | 2/2002 | Johansson et al. |
| 2002/0078382 A1 | 6/2002 | Sheikh et al. |
| 2002/0093917 A1 | 7/2002 | Knobbe et al. |
| 2002/0095607 A1 | 7/2002 | Lin-Hendel |
| 2002/0178374 A1 | 11/2002 | Swimmer et al. |
| 2002/0194489 A1 | 12/2002 | Almogy et al. |
| 2003/0065950 A1 | 4/2003 | Yarborough |
| 2003/0145225 A1 | 7/2003 | Bruton, III et al. |
| 2003/0145226 A1 | 7/2003 | Bruton, III et al. |
| 2003/0152034 A1 | 8/2003 | Zhang et al. |
| 2003/0188189 A1 | 10/2003 | Desai et al. |
| 2003/0223367 A1 | 12/2003 | Shay et al. |
| 2004/0083369 A1 | 4/2004 | Erlingsson et al. |
| 2004/0172557 A1 | 9/2004 | Nakae et al. |
| 2004/0243699 A1 | 12/2004 | Koclanes et al. |
| 2004/0255157 A1 | 12/2004 | Ghanea-Hercock |
| 2005/0050353 A1 | 3/2005 | Thiele et al. |
| 2005/0076235 A1 | 4/2005 | Ormazabal et al. |
| 2005/0076238 A1 | 4/2005 | Ormazabal et al. |
| 2005/0108562 A1 | 5/2005 | Khazan et al. |
| 2005/0138402 A1 | 6/2005 | Yoon et al. |
| 2005/0204157 A1 | 9/2005 | Johnson |
| 2005/0223239 A1 | 10/2005 | Dotan |
| 2005/0240989 A1 | 10/2005 | Kim et al. |
| 2006/0053490 A1 | 3/2006 | Herz et al. |
| 2006/0085543 A1 | 4/2006 | Hrastar |
| 2006/0101515 A1 | 5/2006 | Amoroso et al. |
| 2006/0126522 A1 | 6/2006 | Oh |
| 2006/0161989 A1 | 7/2006 | Reshef et al. |
| 2006/0203774 A1 | 9/2006 | Carrion-Rodrigo |
| 2006/0209701 A1 | 9/2006 | Zhang et al. |
| 2006/0230129 A1 | 10/2006 | Swami et al. |
| 2006/0236401 A1 | 10/2006 | Fosdick |
| 2007/0022090 A1 | 1/2007 | Graham |
| 2007/0025374 A1 | 2/2007 | Stefan et al. |
| 2007/0067623 A1 | 3/2007 | Ward |
| 2007/0097976 A1 | 5/2007 | Wood et al. |
| 2007/0100905 A1 | 5/2007 | Masters et al. |
| 2007/0101431 A1 | 5/2007 | Clift et al. |
| 2007/0115993 A1 | 5/2007 | Cohen |
| 2007/0143827 A1 | 6/2007 | Nicodemus et al. |
| 2007/0143851 A1 | 6/2007 | Nicodemus et al. |
| 2007/0177499 A1 | 8/2007 | Gavrilescu et al. |
| 2007/0208822 A1 | 9/2007 | Wang et al. |
| 2007/0208936 A1 | 9/2007 | Ramos |
| 2007/0209070 A1 | 9/2007 | Yadav |
| 2007/0226320 A1 | 9/2007 | Hager et al. |
| 2007/0240215 A1 | 10/2007 | Flores et al. |
| 2007/0250930 A1 | 10/2007 | Aziz et al. |
| 2007/0282782 A1 | 12/2007 | Carey et al. |
| 2008/0005782 A1 | 1/2008 | Aziz |
| 2008/0018927 A1 | 1/2008 | Martin et al. |
| 2008/0022000 A1 | 1/2008 | Furuya et al. |
| 2008/0034429 A1 | 2/2008 | Schneider |
| 2008/0046989 A1 | 2/2008 | Wahl |
| 2008/0060074 A1 | 3/2008 | Okuyama |
| 2008/0071728 A1 | 3/2008 | Lim |
| 2008/0082722 A1 | 4/2008 | Savagaonkar et al. |
| 2008/0083034 A1 | 4/2008 | Kim et al. |
| 2008/0098476 A1 | 4/2008 | Syversen |
| 2008/0104046 A1 | 5/2008 | Singla et al. |
| 2008/0127346 A1 | 5/2008 | Oh et al. |
| 2008/0162397 A1 | 7/2008 | Zaltzman |
| 2008/0168559 A1 | 7/2008 | Touitou et al. |
| 2008/0170566 A1 | 7/2008 | Akimoto |
| 2008/0229415 A1 | 9/2008 | Kapoor et al. |
| 2009/0077664 A1 | 3/2009 | Hsu et al. |
| 2009/0089040 A1 | 4/2009 | Monastyrsky et al. |
| 2009/0104046 A1 | 4/2009 | Martin et al. |
| 2009/0158407 A1 | 6/2009 | Nicodemus et al. |
| 2009/0158418 A1 | 6/2009 | Rao et al. |
| 2009/0170566 A1 | 7/2009 | Kwon et al. |
| 2009/0199296 A1 | 8/2009 | Xie et al. |
| 2009/0241173 A1 | 9/2009 | Troyansky |
| 2009/0249466 A1 | 10/2009 | Motil et al. |
| 2009/0249470 A1 | 10/2009 | Litvin et al. |
| 2009/0254973 A1 | 10/2009 | Kwan |
| 2009/0288158 A1 | 11/2009 | Izatt et al. |
| 2009/0296641 A1 | 12/2009 | Bienas et al. |
| 2009/0327688 A1 | 12/2009 | Li et al. |
| 2009/0328196 A1 | 12/2009 | Bovee |
| 2010/0005339 A1 | 1/2010 | Hooks |
| 2010/0077483 A1 | 3/2010 | Stolfo et al. |
| 2010/0122317 A1 | 5/2010 | Yadav |
| 2010/0122343 A1 | 5/2010 | Ghosh et al. |
| 2010/0169973 A1 | 7/2010 | Kim et al. |
| 2010/0269175 A1 | 10/2010 | Stolfo et al. |
| 2010/0293615 A1 | 11/2010 | Ye |
| 2010/0299430 A1 | 11/2010 | Powers et al. |
| 2011/0023118 A1 | 1/2011 | Wright et al. |
| 2011/0067107 A1 | 3/2011 | Weeks et al. |
| 2011/0078309 A1 | 3/2011 | Bloch |
| 2011/0099633 A1 | 4/2011 | Aziz |
| 2011/0113427 A1 | 5/2011 | Dotan |
| 2011/0138456 A1 | 6/2011 | Ormazabal et al. |
| 2011/0141937 A1 | 6/2011 | Breslin et al. |
| 2011/0145920 A1 | 6/2011 | Mahaffey et al. |
| 2011/0167494 A1 | 7/2011 | Bowen |
| 2011/0178930 A1 | 7/2011 | Scheidt et al. |
| 2011/0185430 A1 | 7/2011 | Sallam |
| 2011/0214176 A1 | 9/2011 | Burch et al. |
| 2011/0214182 A1 | 9/2011 | Adams et al. |
| 2011/0219443 A1 | 9/2011 | Hampel |
| 2011/0219449 A1 | 9/2011 | St. Neitzel |
| 2011/0247071 A1 | 10/2011 | Hooks et al. |
| 2011/0271341 A1 | 11/2011 | Satish et al. |
| 2011/0288940 A1 | 11/2011 | Hordan et al. |
| 2012/0023572 A1 | 1/2012 | William, Jr. et al. |
| 2012/0030745 A1 | 2/2012 | Bauer |
| 2012/0030750 A1 | 2/2012 | Bhargava et al. |
| 2012/0079596 A1 | 3/2012 | Thomas et al. |
| 2012/0084866 A1 | 4/2012 | Stolfo |
| 2012/0106377 A1 | 5/2012 | Sommers et al. |
| 2012/0124363 A1 | 5/2012 | Dietrich et al. |
| 2012/0137342 A1 | 5/2012 | Hartrell et al. |
| 2012/0137367 A1 | 5/2012 | Dupont et al. |
| 2012/0144488 A1 | 6/2012 | Sankruthi |
| 2012/0151565 A1 | 6/2012 | Fiterman |
| 2012/0185563 A1 | 7/2012 | Sugiyama et al. |
| 2012/0240182 A1 | 9/2012 | Marayanaswamy et al. |
| 2012/0255003 A1 | 10/2012 | Sallam |
| 2012/0255004 A1 | 10/2012 | Sallam |
| 2012/0291090 A1 | 11/2012 | Srinivasan et al. |
| 2012/0297488 A1 | 11/2012 | Kapoor et al. |
| 2012/0324094 A1 | 12/2012 | Wyatt et al. |
| 2012/0331553 A1 | 12/2012 | Aziz et al. |
| 2013/0052992 A1 | 2/2013 | Lee et al. |
| 2013/0054682 A1 | 2/2013 | Malik et al. |
| 2013/0061097 A1 | 3/2013 | Mendel et al. |
| 2013/0080641 A1 | 3/2013 | Lui et al. |
| 2013/0086684 A1 | 4/2013 | Mohler |
| 2013/0091573 A1 | 4/2013 | Herz et al. |
| 2013/0097706 A1 | 4/2013 | Titonis et al. |
| 2013/0111547 A1 | 5/2013 | Kraemer |
| 2013/0133072 A1 | 5/2013 | Kraitsman et al. |
| 2013/0152200 A1 | 6/2013 | Alme et al. |

(56) References Cited

U.S. PATENT DOCUMENTS

| | | |
|---|---|---|
| 2013/0167236 A1 | 6/2013 | Sick |
| 2013/0191924 A1 | 7/2013 | Tedesco et al. |
| 2013/0212658 A1 | 8/2013 | Amaya et al. |
| 2013/0219217 A1 | 8/2013 | Seren et al. |
| 2013/0231084 A1 | 9/2013 | Raleigh |
| 2013/0242743 A1 | 9/2013 | Thomas et al. |
| 2013/0247190 A1 | 9/2013 | Spurlock |
| 2013/0290662 A1 | 10/2013 | Teal |
| 2013/0290729 A1 | 10/2013 | Pettigrew et al. |
| 2013/0291111 A1 | 10/2013 | Zhou et al. |
| 2013/0298192 A1 | 11/2013 | Kumar et al. |
| 2013/0298244 A1 | 11/2013 | Kumar et al. |
| 2013/0305377 A1 | 11/2013 | Herz |
| 2013/0329732 A1 | 12/2013 | Vyas et al. |
| 2013/0333040 A1 | 12/2013 | Diehl et al. |
| 2013/0340033 A1 | 12/2013 | Jones et al. |
| 2013/0346472 A1 | 12/2013 | Wheeldon |
| 2013/0347052 A1 | 12/2013 | Choudrie |
| 2014/0046645 A1 | 2/2014 | White et al. |
| 2014/0053267 A1 | 2/2014 | Klein et al. |
| 2014/0068326 A1 | 3/2014 | Quinn |
| 2014/0068779 A1 | 3/2014 | Tan et al. |
| 2014/0090061 A1 | 3/2014 | Avasarala et al. |
| 2014/0096229 A1 | 4/2014 | Burns et al. |
| 2014/0108794 A1 | 4/2014 | Barton et al. |
| 2014/0123280 A1 | 5/2014 | Kedma |
| 2014/0137246 A1 | 5/2014 | Baluda |
| 2014/0150094 A1 | 5/2014 | Rao et al. |
| 2014/0157366 A1 | 6/2014 | Ko et al. |
| 2014/0165203 A1 | 6/2014 | Friedrichs et al. |
| 2014/0215617 A1 | 7/2014 | Smith et al. |
| 2014/0215621 A1 | 7/2014 | Xaypanya et al. |
| 2014/0215625 A1 | 7/2014 | Paul et al. |
| 2014/0237562 A1 | 8/2014 | Nandakumar |
| 2014/0237595 A1 | 8/2014 | Sridhara et al. |
| 2014/0237599 A1 | 8/2014 | Gertner et al. |
| 2014/0245376 A1 | 8/2014 | Hibbert et al. |
| 2014/0250524 A1 | 9/2014 | Meyers et al. |
| 2014/0259092 A1 | 9/2014 | Boucher et al. |
| 2014/0282816 A1 | 9/2014 | Xie et al. |
| 2014/0283076 A1 | 9/2014 | Muttik |
| 2014/0289851 A1 | 9/2014 | Klein et al. |
| 2014/0298419 A1 | 10/2014 | Boubez et al. |
| 2014/0349611 A1 | 11/2014 | Kant et al. |
| 2015/0006384 A1 | 1/2015 | Shaikh |
| 2015/0007312 A1 | 1/2015 | Pidathala et al. |
| 2015/0013006 A1 | 1/2015 | Shulman et al. |
| 2015/0013008 A1 | 1/2015 | Lukacs et al. |
| 2015/0033341 A1 | 1/2015 | Schmidtler et al. |
| 2015/0039513 A1 | 2/2015 | Adjaoute |
| 2015/0074810 A1 | 3/2015 | Saher et al. |
| 2015/0082430 A1 | 3/2015 | Sridhara et al. |
| 2015/0089655 A1 | 3/2015 | Choi et al. |
| 2015/0096048 A1 | 4/2015 | Zhang et al. |
| 2015/0113616 A1 | 4/2015 | Sampas |
| 2015/0121524 A1 | 4/2015 | Fawaz et al. |
| 2015/0121529 A1 | 4/2015 | Quinlan et al. |
| 2015/0128206 A1 | 5/2015 | Haim et al. |
| 2015/0128246 A1 | 5/2015 | Feghali et al. |
| 2015/0143496 A1 | 5/2015 | Thomas et al. |
| 2015/0150125 A1 | 5/2015 | Dulkin et al. |
| 2015/0150130 A1 | 5/2015 | Fiala |
| 2015/0156214 A1 | 6/2015 | Kaminsky |
| 2015/0163121 A1 | 6/2015 | Mahaffey et al. |
| 2015/0172300 A1 | 6/2015 | Cochenour |
| 2015/0195291 A1 | 7/2015 | Zuk et al. |
| 2015/0199512 A1 | 7/2015 | Kim et al. |
| 2015/0200928 A1 | 7/2015 | Burch et al. |
| 2015/0205962 A1 | 7/2015 | Swidowski et al. |
| 2015/0220735 A1 | 8/2015 | Paithane et al. |
| 2015/0254161 A1 | 9/2015 | Baril et al. |
| 2015/0257194 A1 | 9/2015 | Cho |
| 2015/0264068 A1 | 9/2015 | Beauchesne |
| 2015/0264077 A1 | 9/2015 | Berger et al. |
| 2015/0268947 A1 | 9/2015 | Ionescu |
| 2015/0271200 A1 | 9/2015 | Brady et al. |
| 2015/0281267 A1 | 10/2015 | Danahy et al. |
| 2015/0286820 A1 | 10/2015 | Sridhara et al. |
| 2015/0288706 A1 | 10/2015 | Marshall |
| 2015/0310196 A1 | 10/2015 | Turgeman et al. |
| 2015/0326587 A1 | 11/2015 | Vissamsetty et al. |
| 2015/0326588 A1 | 11/2015 | Vissamsetty et al. |
| 2015/0326592 A1 | 11/2015 | Vissamsetty et al. |
| 2015/0326599 A1 | 11/2015 | Vissamsetty et al. |
| 2015/0350236 A1 | 12/2015 | Klinghofer et al. |
| 2015/0358345 A1 | 12/2015 | Clark et al. |
| 2015/0373039 A1 | 12/2015 | Wang |
| 2015/0381376 A1 | 12/2015 | Wardman et al. |
| 2016/0028750 A1 | 1/2016 | Di Pietro et al. |
| 2016/0042179 A1 | 2/2016 | Weingarten |
| 2016/0042180 A1 | 2/2016 | Sayre et al. |
| 2016/0055334 A1 | 2/2016 | Herwono et al. |
| 2016/0055337 A1 | 2/2016 | El-Moussa |
| 2016/0072838 A1 | 3/2016 | Kolton et al. |
| 2016/0078365 A1 | 3/2016 | Baumard |
| 2016/0080414 A1 | 3/2016 | Kolton et al. |
| 2016/0127352 A1 | 5/2016 | Xu et al. |
| 2016/0127413 A1 | 5/2016 | Kraitsman et al. |
| 2016/0142399 A1 | 5/2016 | Pace et al. |
| 2016/0191554 A1 | 6/2016 | Kaminsky |
| 2016/0212225 A1 | 7/2016 | Smith et al. |
| 2016/0261631 A1 | 9/2016 | Vissamsetty et al. |
| 2016/0285914 A1 | 9/2016 | Singh et al. |
| 2016/0315909 A1 | 10/2016 | Von Gravrock et al. |
| 2016/0323300 A1 | 11/2016 | Boss et al. |
| 2016/0323316 A1 | 11/2016 | Kolton et al. |
| 2016/0381023 A1 | 12/2016 | Dulce et al. |
| 2017/0019425 A1 | 1/2017 | Ettema et al. |
| 2017/0026387 A1 | 1/2017 | Vissamsetty et al. |
| 2017/0032122 A1 | 2/2017 | Thakar et al. |
| 2017/0054754 A1 | 2/2017 | Saher et al. |
| 2017/0093910 A1 | 3/2017 | Gukal et al. |
| 2017/0126718 A1 | 5/2017 | Baradaran et al. |
| 2017/0134405 A1 | 5/2017 | Ahmadzadeh et al. |
| 2017/0141980 A1 | 5/2017 | Palanciuc et al. |
| 2017/0147796 A1 | 5/2017 | Sardesai et al. |
| 2017/0149787 A1 | 5/2017 | Niemela et al. |
| 2017/0149795 A1 | 5/2017 | Day, II |
| 2017/0149832 A1 | 5/2017 | Touboul et al. |
| 2017/0171244 A1 | 6/2017 | Vissamsetty et al. |
| 2017/0180421 A1 | 6/2017 | Shieh et al. |
| 2017/0206142 A1 | 7/2017 | Pawar et al. |
| 2017/0206357 A1 | 7/2017 | Gorelik et al. |
| 2017/0230384 A1 | 8/2017 | Touboul et al. |
| 2017/0230402 A1 | 8/2017 | Greenspan et al. |
| 2017/0235967 A1 | 8/2017 | Ray et al. |
| 2017/0244729 A1 | 8/2017 | Fahrny et al. |
| 2017/0244749 A1 | 8/2017 | Shulman et al. |
| 2017/0244755 A1 | 8/2017 | Tsao |
| 2017/0264639 A1 | 9/2017 | Sama et al. |
| 2017/0279839 A1 | 9/2017 | Vasseur et al. |
| 2017/0279846 A1 | 9/2017 | Osterweil et al. |
| 2017/0286676 A1 | 10/2017 | Weingarten et al. |
| 2017/0302458 A1 | 10/2017 | Berger et al. |
| 2017/0302653 A1 | 10/2017 | Ortner et al. |
| 2017/0302665 A1 | 10/2017 | Zou et al. |
| 2017/0302696 A1 | 10/2017 | Schutz et al. |
| 2017/0318054 A1 | 11/2017 | Vissamsetty et al. |
| 2017/0322959 A1 | 11/2017 | Tidwell et al. |
| 2017/0324774 A1 | 11/2017 | Ohayon et al. |
| 2017/0324777 A1 | 11/2017 | Ohayon et al. |
| 2017/0331849 A1 | 11/2017 | Yu et al. |
| 2017/0331856 A1 | 11/2017 | Vissamsetty et al. |
| 2017/0346802 A1 | 11/2017 | Gruskin et al. |
| 2017/0346853 A1 | 11/2017 | Wyatt et al. |
| 2017/0359370 A1 | 12/2017 | Humphries et al. |
| 2018/0013788 A1 | 1/2018 | Vissamsetty et al. |
| 2018/0020005 A1 | 1/2018 | Beiter et al. |
| 2018/0027006 A1 | 1/2018 | Zimmermann et al. |
| 2018/0027017 A1 | 1/2018 | Touboul et al. |
| 2018/0039776 A1 | 2/2018 | Loman et al. |
| 2018/0048665 A1 | 2/2018 | Shulman et al. |
| 2018/0063187 A1 | 3/2018 | St Pierre |
| 2018/0089430 A1 | 3/2018 | Mayo |

(56) References Cited

U.S. PATENT DOCUMENTS

| | | |
|---|---|---|
| 2018/0146008 A1 | 5/2018 | Vissamsetty et al. |
| 2018/0173876 A1 | 6/2018 | Vissamsetty et al. |
| 2018/0183815 A1 | 6/2018 | Enfinger |
| 2018/0248896 A1 | 8/2018 | Challita et al. |
| 2019/0042745 A1 | 2/2019 | Chen et al. |
| 2019/0052659 A1 | 2/2019 | Weingarten et al. |
| 2019/0068642 A1 | 2/2019 | Araujo et al. |
| 2019/0073475 A1 | 3/2019 | Vissamsetty et al. |
| 2019/0114426 A1 | 4/2019 | Cohen et al. |
| 2019/0199736 A1 | 6/2019 | Howard et al. |
| 2019/0253453 A1 | 8/2019 | Vissamsetty et al. |
| 2019/0354355 A1 | 11/2019 | Jacobson et al. |
| 2019/0379697 A1 | 12/2019 | Vissamsetty et al. |
| 2020/0143054 A1 | 5/2020 | Cohen et al. |
| 2020/0218806 A1 | 7/2020 | Cho |
| 2020/0252429 A1 | 8/2020 | Vissamsetty et al. |
| 2020/0374087 A1 | 11/2020 | Vissamsetty et al. |
| 2021/0397710 A1 | 12/2021 | Cohen et al. |
| 2022/0070256 A1 | 3/2022 | Singh et al. |
| 2022/0391496 A9 | 12/2022 | Cho |
| 2023/0007025 A1 | 1/2023 | Weingarten et al. |
| 2023/0007026 A1 | 1/2023 | Weingarten et al. |
| 2023/0007027 A1 | 1/2023 | Weingarten et al. |
| 2023/0007028 A1 | 1/2023 | Weingarten et al. |
| 2023/0007029 A1 | 1/2023 | Weingarten et al. |
| 2023/0007030 A1 | 1/2023 | Weingarten et al. |
| 2023/0007031 A1 | 1/2023 | Weingarten et al. |

FOREIGN PATENT DOCUMENTS

| | | |
|---|---|---|
| JP | 2016-512631 | 4/2016 |
| JP | 2017-504102 | 2/2017 |
| KR | 10-2015-0101811 | 9/2015 |
| KR | 10-1969572 | 4/2019 |
| WO | WO 02/27440 A2 | 4/2002 |
| WO | WO 2010/030169 A2 | 3/2010 |
| WO | WO 2012/027669 | 3/2012 |
| WO | WO 2013/014672 | 1/2013 |
| WO | WO 2015/171780 A1 | 11/2015 |
| WO | WO 2015/171789 A1 | 11/2015 |
| WO | WO 2016/024268 | 2/2016 |
| WO | WO 2016/081561 A1 | 5/2016 |
| WO | WO 2017/064710 | 4/2017 |
| WO | WO 2019/092530 | 5/2019 |
| WO | WO 2019/032728 | 3/2020 |

OTHER PUBLICATIONS

Chen et al., "MitM attack by name collision: Cause analysis and vulnerability assessment in the new gTLD era." Security and Privacy (SP), 2016 IEEE Symposium on. IEEE (2016).

Dini et al., "Probabilistic Contract Compliance for Mobile Applications", Eighth International Conference on Availability, Reliability and Security (ARES) IEEE, Sep. 2-6, 2013, pp. 599-606.

Gu et al., "Malicious Shellcode Detection with Virtual Memory Snapshots," 2010 Proceedings IEEE Infocom, San Diego, CA, 2010, pp. 1-9, accessed Mar. 6, 2019.

Installing a Tanium Client—distributed also using user/password (not encrypted) from a hosted Module server, downloaded from https://docs.tanium.com/client/client/deployment.html#client_management on Apr. 1, 2021.

IBM Software, "Stepping up the battle against advanced threats", IBM Trusteer Apex Thought Leadership White Paper, Dec. 2013, WGW03043-USEN-00.

"IBM Security Qradar SIEM Installation Guide" downloaded from http://www.siem.su/docs/ibm/Installation_and_updating/IBM_Security_QRadar_installation_Guide.pdf, printed 2013, vol. 7.2 in 54 pages.

IBM Security Guardium Insights for IBM Cloud Park for Security', printed from https://www.ibm.com/downloads/cas/QY1RYRLP, printed May 26, 2021 in 12 pages.

IBM Security Qradar Solutuion Brief "Visibility, detection, investigation and response" printed from https://www.ibm.com/downloads/cas/OP62GKAR, printed on May 26, 2021 in 11 pgs.

"IBM Security Trusteer Apex Advanced malware Protection (SaaS) delivers an enterprise endpoint security solution to help protect organizations from advanced malware and targeted attacks" downloaded from https://www-01.ibm.com/common/ssi/rep_ca/0/877/ENUSZP14-0390/ENUSZP14-0390.PDF, printed Aug. 5, 2014, in 9 pgs.

IBM Guardium Documentation "Components and Topology", downloaded from https://www.ibm.com/docs/en/qsip/7.4?topic=deployment-qradar-architecture-overview, printed on Jun. 8, 2021 in 3 pages.

IBM Software "Stepping up the battle against advanced threats", downloaded from https://citrixready.citrix.com/content/dam/ready/partners/ib/ibm-global-services/ibm-security-trusteer-apex-advanced-malware-protection/wgw03043usen.pdf, Printed Dec. 2013 in 12 pages.

Laureano et al., M., "Intrusion detection in virtual machine environments. In Euromicro Conference, 2004. Proceedings." 30th (pp. 520-525). IEEE Sep. 30, 2004.

Liu, Yu-Feng; Zhang Li-Wei; Liang, Juan; Qu, Sheng; Ni, Zhi-Qiang;, "Detecting Trojan Horses Based on System Behavior Using Machine Learning Method", International Conference on Machine Learning and Cybernetics (ICMLC), IEEE, Jul. 11-14, 2010, pp. 855-860.

IBM, "Qradar Architecture overview", downloaded from https://www.ibm.com/docs/en/qsip/7.4?topic=deployment-qradar-architecture-overview printed May 28, 2021 in 6 pgs.

Moussaileb et al., "Ransomware's Early Mitigation Mechanisms," Proceedings ARES 2018 Proceedings of the 13th International Conference on Availability, Reliability and Security Article No. 2, pp. 1-10 (2018).

Ornaghi et al., "Man in the middle attacks." Blackhat Conference Europe (2003).

Ramachandran et al., "Detecting ARP spoofing: An active technique." International Conference on Information Systems Security, Springer, Berlin, Heidelberg (2005).

Rüdiger Schollmeier, A Definition of Peer-to-Peer Networking for the Classification of Peer-to-Peer Architectures and Applications, Proceedings of the First International Conference on Peer-to-Peer Computing, IEEE (2002).

Shosha et al., A.F., "Evasion-resistant malware signature based on profiling kernel data structure objects." In 2012 7th International Conference on Risks and Security of Internet and Systems (CRISIS) (pp. 1-8). IEEE., Oct. 31, 2012.

Tanium™ Client Management 1.6 User Guide, downloaded from https://docs.tanium.com/client_management/client_management/index.html on Apr. 1, 2021.

Ullrich et al., "IPv6 Security: Attacks and Countermeasures in a Nutshell." 8th USENIX Workshop on Offensive Technologies (2015).

Xu, J-Y; Sung, A.H.; Chavez, P.; Mukkamala, S.; "Polymorphic Malicious Executable Scanner by API Sequence Analysis", Fourth International Conference on Hybrid Intelligent Systems, IEEE Dec. 5-8, 2004, pp. 378-383.

Communication Pursuant to Article 94(3) EPC dated Dec. 11, 2018 for European Application 15 760 520.5, in 7 pages.

Extended European Search Report dated May 9, 2019 for Application No. 16855062.2, in 7 pages.

European Search Report dated Apr. 29, 2021 in European Patent Application No. 18844671 in 38 pages.

Extended European Search Report dated Jan. 25, 2021 for European Patent Application No. 20181537.0, in 10 pages.

Reaqta Hive, A.I. Based Endpoint Threat Response, Whitepaper, 27 pages (Apr. 6, 2017).

International Search Report and Written Opinion dated Feb. 18, 2016 for International Application No. PCT/IL2015/050802, in 10 pages.

International Preliminary Report on Patentability dated Feb. 14, 2017 for International Application No. PCT/IL2015/050802, in 7 pages.

(56) References Cited

OTHER PUBLICATIONS

International Search Report and Written Opinion dated Apr. 20, 2017 for International Application No. PCT/IL2016/051110, in 10 pages.
International Search Report and Written Opinion dated Dec. 11, 2018 for International Application No. PCT/US2018/045850, in 12 pages.
International Search Report and Written Opinion dated Aug. 24, 2020 for International Application No. PCT/US2020/033872, in 8 pages.
International Search Report issued in application No. PCT/US2021/050129 dated Dec. 21, 2021.
International Search Report in corresponding International Patent Application No. PCT/US2015/29490, dated Aug. 7, 2015, in 2 pages.
Written Opinion in corresponding International Patent Application No. PCT/US2015/29490, dated Aug. 7, 2015, in 6 pages.
International Preliminary Report on Patentability in corresponding International Patent Application No. PCT/US2015/29490, dated Nov. 8, 2016, in 7 pages.
International Search Report in corresponding International Patent Application No. PCT/US2015/29501, dated Aug. 7, 2015, in 2 pages.
Written Opinion in corresponding International Patent Application No. PCT/US2015/29501, dated Aug. 7, 2015, in 6 pages.
International Preliminary Report on Patentability in corresponding International Patent Application No. PCT/US2015/29501, dated Nov. 8, 2016, in 7 pages.
International Search Report in corresponding International Patent Application No. PCT/US2015/61271, dated Feb. 2, 2016, in 2 pages.
Written Opinion in corresponding International Patent Application No. PCT/US2015/61271, dated Feb. 2, 2016, in 6 pages.
International Preliminary Report on Patentability in corresponding International Patent Application No. PCT/US2015/61271, dated May 23, 2017, in 7 pages.
Office Action dated Jul. 24, 2019 in European Patent Application No. 15760520.5, in 8 pages.
Office Action dated May 31, 2022 in Japanese Patent Application No. 2020-503272, in 7 pages.
Extended European Search Report dated Aug. 25, 2021 for European Patent Application No. 21162973.8, in 5 pages.

METHOD OF MALWARE DETECTION AND SYSTEM THEREOF

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application claims the benefit of U.S. patent application Ser. No. 16/849,808, filed Apr. 15, 2020, now U.S. Pat. No. 11,625,485, U.S. patent application Ser. No. 15/623,669, filed Jun. 15, 2017, now U.S. Pat. No. 10,664,596, and U.S. patent application Ser. No. 14/456,127, filed Aug. 11, 2014, now U.S. Pat. No. 9,710,648, the entire contents of each of which are hereby incorporated by reference herein for all purposes as if set forth fully herein.

TECHNICAL FIELD

The presently disclosed subject matter relates, in general, to the field of the detection of malicious software (malware), and more specifically, to methods and systems for behavior based malware detection.

BACKGROUND OF THE INVENTION

With the rapid growth of computer technology and widespread Internet access, malware threats have continued to grow significantly in recent decades, and thus have caused severe damage to systems, such as hardware failures and loss of critical data, etc.

Various antivirus technologies are currently in use, including signature and behavior based analysis, which aim to identify and prevent further spread of malware in the network. Signature-based analysis involves searching for known patterns of malicious code within executable code. However, malware is often modified (e.g., by obfuscating and randomizing content) in order to change its signature without affecting functionality, which renders the signature-based analysis mechanism as being increasingly ineffective. Due to an increase in malware variants (e.g., malware variants with the same behavior but different signatures), behavior-based analysis may be used to identify malware variants that have similar effects and thus can be handled with similar security measures.

Behavior-based analysis detects malware by monitoring behaviors of malicious activities rather than static signatures. Existing behavioral monitoring systems include a database of actions that are blacklisted and indicate malicious intent. If a given process or program performs any of the actions listed in the database, the action is blocked, and the process may be identified as malicious, and thus be terminated, by the monitoring system.

There is a need in the art for a new method and system for malware detection.

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 8,555,385 (Bhatkar et al.) entitled "Techniques for behavior based malware analysis" discloses techniques for behavior based malware analysis. In one particular embodiment, the techniques may be realized as a method for behavior based analysis comprising receiving trace data, analyzing, using at least one computer processor, observable events to identify low level actions, analyzing a plurality of low level actions to identify at least one high level behavior, and providing an output of the at least one high level behavior.

U.S. Pat. No. 7,530,106 (Zaitsev et al.) entitled "System and method for security rating of computer processes" discloses a system, method, and computer program product for secure rating of processes in an executable file for malware presence, comprising: (a) detecting an attempt to execute a file on a computer; (b) performing an initial risk assessment of the file; (c) starting a process from code in the file; (d) analyzing an initial risk pertaining to the process and assigning an initial security rating to the process; (e) monitoring the process for the suspicious activities; (f) updating the security rating of the process when the process attempts to perform the suspicious activity; (g) if the updated security rating exceeds a first threshold, notifying a user and continuing execution of the process; and (h) if the updated security rating exceeds a second threshold, blocking the action and terminating the process.

U.S. Pat. No. 8,607,340 (Wright) entitled "Host intrusion prevention system using software and user behavior analysis" discloses improved capabilities for threat detection using a behavioral-based host-intrusion prevention method and system for monitoring a user interaction with a computer, software application, operating system, graphic user interface, or some other component or client of a computer network, and performing an action to protect the computer network based at least in part on the user interaction and a computer code process executing during or in association with a computer usage session.

US Patent Application No. 2012/079,596 (Thomas et al.) entitled "Method and system for automatic detection and analysis of malware" discloses a method of detecting malicious software (malware) including receiving a file and storing a memory baseline for a system. The method also includes copying the file to the system, executing the file on the system, terminating operation of the system, and storing a post-execution memory map. The method further includes analyzing the memory baseline and the post-execution memory map and determining that the file includes malware.

SUMMARY OF THE INVENTION

In accordance with an aspect of the presently disclosed subject matter, there is provided a computer-implemented method of detecting malware in real time in a live environment, the method comprising: monitoring one or more operations of at least one program concurrently running in the live environment; building at least one stateful model in accordance with the one or more operations; analyzing the at least one stateful model to identify one or more behaviors; and determining the presence of malware based on the identified one or more behaviors.

In accordance with an embodiment of the presently disclosed subject matter, there is further provided a computer-implemented method, wherein the monitoring further comprises: generating event data characterizing one or more events, each of the events being indicative of a corresponding monitored operation of the one or more operations.

In accordance with an embodiment of the presently disclosed subject matter, there is yet further provided a computer-implemented method, wherein the monitoring the one or more operations further includes selecting at least one operation of interest from the one or more operations, and monitoring the selected at least one operation of interest.

In accordance with an embodiment of the presently disclosed subject matter, there is yet further provided a computer-implemented method, wherein the at least one operation of interest includes one or more in-process operations and/or one or more kernel related operations.

In accordance with an embodiment of the presently disclosed subject matter, there is yet further provided a computer-implemented method, wherein the kernel related operations include one or more of the following: file system operations, process and memory operations, registry operations, and network operations.

In accordance with an embodiment of the presently disclosed subject matter, there is yet further provided a computer-implemented method, wherein the in-process operations are monitored by intercepting one or more library calls representing the in-process operations.

In accordance with an embodiment of the presently disclosed subject matter, there is yet further provided a computer-implemented method, wherein the kernel related operations are monitored by intercepting one or more system calls representing the kernel related operations.

In accordance with an embodiment of the presently disclosed subject matter, there is yet further provided a computer-implemented method, wherein the kernel related operations are monitored by registering one or more kernel filter drivers for the kernel related operations via one or more callback functions.

In accordance with an embodiment of the presently disclosed subject matter, there is yet further provided a computer-implemented method further comprising, for each event of the one or more events, generating a respective event data characterizing the event, wherein the event data includes at least the following attributes of the event: operation type, and source of the event.

In accordance with an embodiment of the presently disclosed subject matter, there is yet further provided a computer-implemented method, wherein the at least one stateful model includes one or more objects derived from the one or more operations and one or more relationships identified among the objects in accordance with the operations.

In accordance with an embodiment of the presently disclosed subject matter, there is yet further provided a computer-implemented method, wherein each of the objects represents an entity involved in the operations and is of a type selected from a group that includes: process object, file object, network object, registry object, and windows object.

In accordance with an embodiment of the presently disclosed subject matter, there is yet further provided a computer-implemented method, wherein each of the at least one stateful model is a program-level stateful model that represents a sequence of linked operations related to a given program of the at least one program.

In accordance with an embodiment of the presently disclosed subject matter, there is yet further provided a computer-implemented method, wherein the at least one stateful model is a system-level stateful model that represents operations related to all programs that run concurrently in the live environment.

In accordance with an embodiment of the presently disclosed subject matter, there is yet further provided a computer-implemented method, wherein the system-level stateful model includes one or more program-level stateful models each representing a sequence of linked operations related to a given program of the all programs.

In accordance with an embodiment of the presently disclosed subject matter, there is yet further provided a computer-implemented method further comprising monitoring one or more kernel related operations of the at least one program; building at least one stateful model based on the monitored kernel related operations; analyzing the at least one stateful model to identify one or more behaviors; and determining the presence of malware based on a behavioral score of the stateful model.

In accordance with an embodiment of the presently disclosed subject matter, there is yet further provided a computer-implemented method wherein the at least one stateful model includes one or more objects derived from the one or more operations and one or more relationships identified among the objects in accordance with the operations.

In accordance with an embodiment of the presently disclosed subject matter, there is yet further provided a computer-implemented method, wherein the building the at least one stateful model comprises, for each event data associated with the event, normalizing the event data giving rise to an abstract event; retrieving one or more objects from the abstract event, each of the objects representing an entity involved in a corresponding operation and being of a type selected from a group that includes: process object, file object, network object, registry object and windows object, at least one of the objects representing the source of the event; identifying one or more relationships among the objects in accordance with the abstract event, and generating respective associations among the objects corresponding to the identified relationships, giving rise to an event context comprising the one or more objects and the associations therein; in case of the event being a first event of a stateful model, generating the stateful model including the event context; otherwise updating a previous stateful model based on the event context, giving rise to an updated stateful model, the previous stateful model corresponding to at least one previous event that precedes the event.

In accordance with an embodiment of the presently disclosed subject matter, there is yet further provided a computer-implemented method, wherein the updating further includes: in case the previous stateful model includes the one or more objects, adding the associations of the event context to the previous stateful model, giving rise to the updated stateful model; otherwise in case of at least one object of the objects being a new object that is not included in the previous stateful model, adding the new object and the associations of the event context to the previous stateful model, giving rise to the updated stateful model.

In accordance with an embodiment of the presently disclosed subject matter, there is yet further provided a computer-implemented method further comprising selecting selected event data associated with events of interest from the event data based on one or more predefined filtering rules and applying the normalizing of the event data with respect to the selected event data.

In accordance with an embodiment of the presently disclosed subject matter, there is yet further provided a computer-implemented method, wherein the one or more predefined filtering rules include filtering out event data associated with the following events: uncompleted events, memory related events of which a targeting process is not a remote process, and events in which a targeting process does not exist.

In accordance with an embodiment of the presently disclosed subject matter, there is yet further provided a computer-implemented method, wherein normalizing the event data includes formatting the event data and parsing the formatted event data giving rise to the abstract event.

In accordance with an embodiment of the presently disclosed subject matter, there is yet further provided a computer-implemented method, wherein the analyzing the at least one stateful model includes analyzing the event context in view of the stateful model or the updated stateful model in accordance with one or more predefined behavioral logics, and determining the presence of at least one behavior of the one or more behaviors upon any of the predefined behavioral logics being met, the at least one behavior related to a sequence of events of the stateful model including at least the event.

In accordance with an embodiment of the presently disclosed subject matter, there is yet further provided a computer-implemented method, wherein the predefined behavioral logics include determining a behavior of self-execution when the following condition is met: a target of an event is an object that is included in the stateful model.

In accordance with an embodiment of the presently disclosed subject matter, there is yet further provided a computer-implemented method wherein each of the at least one behavior is assigned with a respective behavioral score.

In accordance with an embodiment of the presently disclosed subject matter, there is yet further provided a computer-implemented method, wherein the determining the presence of malware further includes: in case of the at least one behavior being determined: searching if there is a previous stateful model score associated with the previous stateful model, the previous stateful model score being an aggregated behavioral score of all previous behavioral scores assigned for respective previous determined behaviors, the previous determined behaviors being related to the at least one previous event of the previous stateful model, if not, determining a sum of the respective behavioral score assigned for each of the at least one behavior as the stateful model score associated with the stateful model; otherwise increasing the previous stateful model score with the sum, giving rise to the stateful model score; comparing the stateful model score with a predefined threshold; and determining the presence of malware if the stateful model score passes the predefined threshold.

In accordance with an embodiment of the presently disclosed subject matter, there is yet further provided a computer-implemented method, wherein the respective behavioral score is assigned with a corresponding weight factor if a condition is met, and the increasing comprises applying the corresponding weight factor to the respective behavioral score giving rise to a respective weighted behavioral score, and increasing the previous stateful model score with a sum of the respective weighted behavioral score assigned for each of the at least one behavior.

In accordance with an embodiment of the presently disclosed subject matter, there is yet further provided a computer-implemented method, wherein the condition includes that a source of an event is a remote process and a target of the event is a system process.

In accordance with an embodiment of the presently disclosed subject matter, there is yet further provided a computer-implemented method, wherein the method further comprises: eliminating determined malware by remediating the one or more operations indicated by the stateful model.

In accordance with an aspect of the presently disclosed subject matter, there is yet further provided a system for detecting malware in real time in a live environment, the system comprising a processor configured to perform at least the following: monitor one or more operations of at least one program concurrently running in the live environment; build at least one stateful model in accordance with the one or more operations; analyze the at least one stateful model to identify one or more behaviors; and determine the presence of malware based on the identified one or more behaviors.

In accordance with an embodiment of the presently disclosed subject matter, there is yet further provided a system, wherein the at least one stateful model includes one or more objects derived from the one or more operations and one or more relationships identified among the objects in accordance with the operations.

In accordance with an embodiment of the presently disclosed subject matter, there is yet further provided a system, wherein each of the objects represents an entity involved in the operations and is of a type selected from a group that includes: process object, file object, network object, registry object, and windows object.

In accordance with an embodiment of the presently disclosed subject matter, there is yet further provided a system, wherein each of the at least one stateful model is a program-level stateful model that represents a sequence of linked operations related to a given program of the at least one program.

In accordance with an embodiment of the presently disclosed subject matter, there is yet further provided a system, wherein the at least one stateful model is a system-level stateful model that represents operations related to all programs that run concurrently in the live environment.

In accordance with an embodiment of the presently disclosed subject matter, there is yet further provided a system, wherein the system-level stateful model includes one or more program-level stateful models each representing a sequence of linked operations related to a given program of the all programs.

In accordance with an embodiment of the presently disclosed subject matter, there is yet further provided a system, wherein the processor is further configured to perform the following: monitor one or more kernel related operations of said at least one program; build at least one stateful model based on said monitored kernel related operations; analyze the at least one stateful model to identify one or more behaviors; and determine the presence of malware based on a behavioral score of said stateful model.

In accordance with an embodiment of the presently disclosed subject matter, there is yet further provided a system, wherein the kernel related operations include one or more of the following: file system operations, process and memory operations, registry operations, and network operations.

In accordance with an embodiment of the presently disclosed subject matter, there is yet further provided a system, wherein the processor is further configured to monitor the one or more kernel related operations by registering one or more kernel filter drivers for the kernel related operations via one or more callback functions.

In accordance with an aspect of the presently disclosed subject matter, there is yet further provided a non-transitory program storage device readable by machine, tangibly embodying a program of instructions executable by the machine to perform method steps for detecting malware in real time in a live environment, the method comprising: monitoring one or more operations of at least one program concurrently running in the live environment; building at least one stateful model in accordance with the one or more operations; analyzing the at least one stateful model to identify one or more behaviors; and determining the presence of malware based on the identified one or more behaviors.

BRIEF DESCRIPTION OF THE DRAWINGS

In order to understand the presently disclosed subject matter and to see how it may be carried out in practice, the subject matter will now be described, by way of non-limiting example only, with reference to the accompanying drawings, in which.

DETAILED DESCRIPTION

Figure 1:
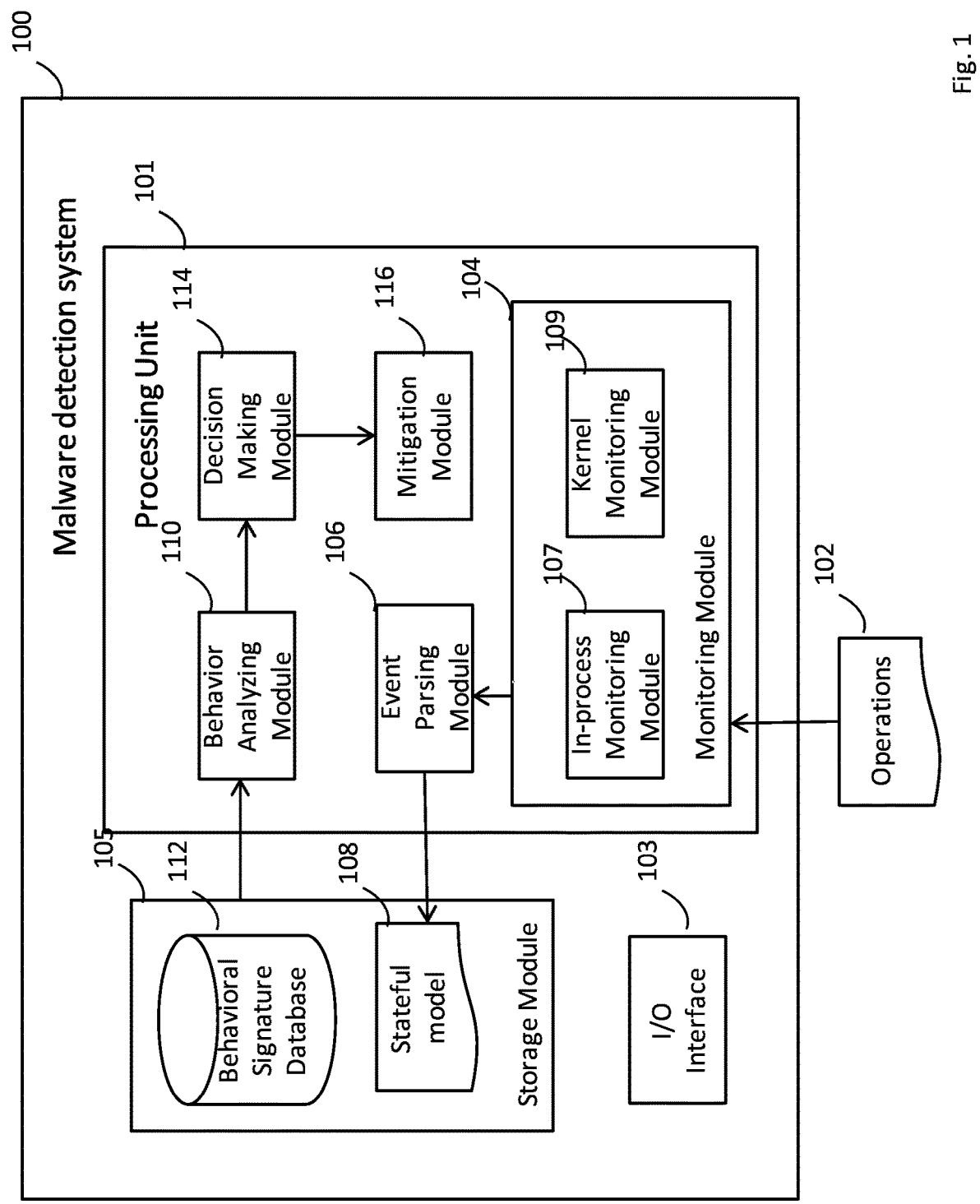
FIG. 1 is a functional block diagram schematically illustrating a malware detection system, in accordance with certain embodiments of the presently disclosed subject matter.

In the following detailed description, numerous specific details are set forth in order to provide a thorough understanding of the disclosed subject matter. However, it will be understood by those skilled in the art that the present disclosed subject matter can be practiced without these specific details. In other instances, well-known methods, procedures, and components have not been described in detail so as not to obscure the present disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "monitoring", "building", "analyzing", "determining", "generating", "selecting", "normalizing", "comparing", "formatting", "parsing", "searching", "increasing", "eliminating", "terminating", "providing", or the like, include action and/or processes of a computer that manipulate and/or transform data into other data, said data represented as physical quantities, e.g. such as electronic quantities, and/or said data representing the physical objects. The terms "computer", "processor", "processing unit", "host machine", and "end user station" should be expansively construed to include any kind of electronic device with data processing capabilities, including, by way of non-limiting examples, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein can be performed by a computer specially constructed for the desired purposes or by a general purpose computer specially configured for the desired purpose by a computer program stored in a non-transitory computer readable storage medium.

The term "non-transitory" is used herein to exclude transitory, propagating signals, but to otherwise include any volatile or non-volatile computer memory technology suitable to the presently disclosed subject matter.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination.

Figure 2:
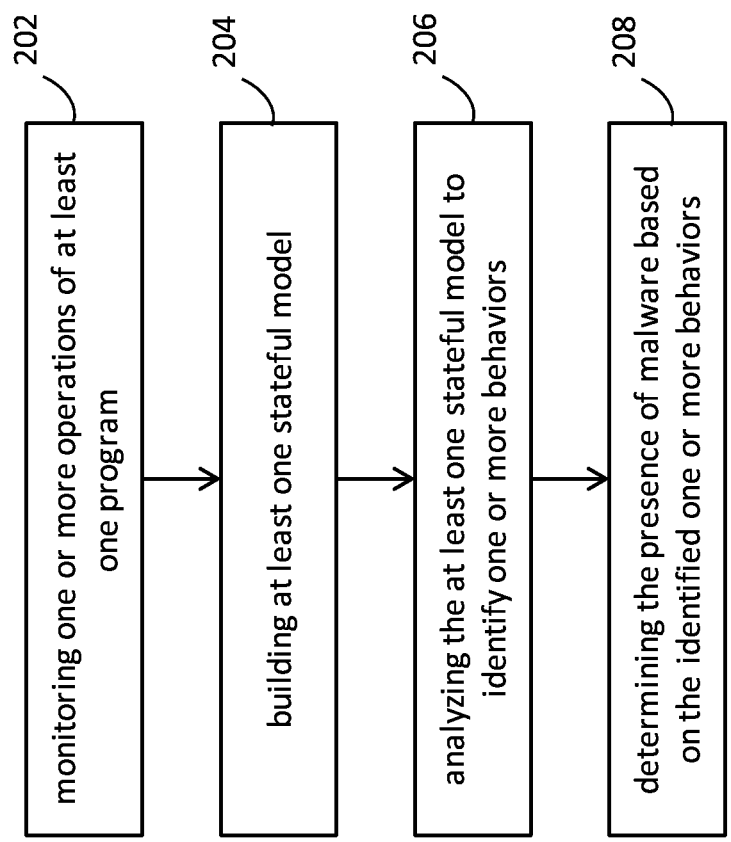
FIG. 2 is a generalized flowchart of detecting malware in accordance with certain embodiments of the presently disclosed subject matter.
Figure 3:
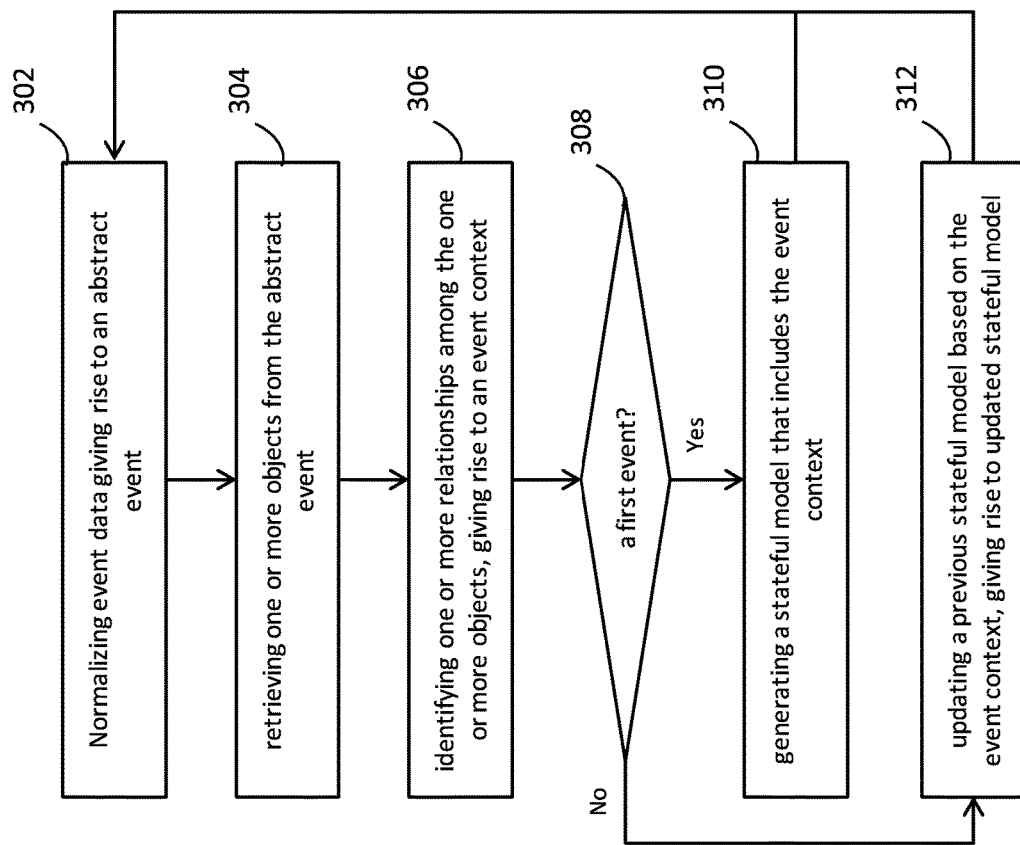
FIG. 3 is a generalized flowchart of building a stateful model in accordance with certain embodiments of the presently disclosed subject matter.

In embodiments of the presently disclosed subject matter, fewer, more and/or different stages than those shown in FIGS. 2 and 3 may be executed. In embodiments of the presently disclosed subject matter one or more stages illustrated in FIGS. 2 and 3 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

As aforementioned, behavior-based analysis detects malware by monitoring behaviors of malicious activities rather than static signatures. There are a number of problems existing m current behavior-based technologies. For instance, due to the frequently changing behaviors of malicious programs, new instances of malwares may not be detected immediately due to lack of information about their behaviors and functionality. Current behavior-based technologies may also fail to trace a sequence of events, each of which, independently, is not identified as malicious, but when considered within the sequence context, is actually performing a malicious action. Moreover, current behavior-based technologies are normally implemented by performing emulation and running suspected malware in a safe environment (e.g., a sandboxed virtual machine) to reveal otherwise obscured logics and behaviors. This kind of emulation is normally very limited and the suspected malware under scrutiny never actually runs in a live environment. Thus it is impossible to actually observe full execution and interaction of the suspected malware with other processes and files that are not emulated in the safe environment. Therefore, not all potential malicious behaviors of the suspected malware can be detected by performing such emulation. Furthermore, it is typically resource-intensive to collect and analyze the large amount of operation information contained by suspicious malwares in order to identify potential behaviors, especially for a host machine with limited resources, such as an end user station. Certain embodiments of the detailed description are able to cope with these problems.

Bearing this in mind, attention is drawn to FIG. 1, schematically illustrating a functional block diagram of a malware detection system in accordance with certain embodiments of the presently disclosed subject matter.

The term "malware" used in this specification should be expansively construed to include any kind of computer virus, ransomware, worms, trojan horses, rootkits, keyloggers, dialers, spyware, adware, malicious Browser Helper-Objects (BHOs), rogue security software, or any other malicious or undesirable programs.

A Malware Detection System 100 illustrated in FIG. 1 implements a computer-based malware detection mechanism, which enables end users to detect malware in real time in a live environment. The term "live environment" used in this specification should be expansively construed to include any kind of host machine configuration where computer programs and products are actually put into operation for their intended uses by end users, such as, for example, an end user station with programs concurrently running in a production environment, in contrast to a safe environment, such as, for example, an emulated environment, or a sandboxed virtual machine environment.

As shown, the Malware Detection System 100 includes at least one Processing Unit 101 that comprises the following functional modules: Monitoring Module 104, Event Parsing Module 106, Behavior Analyzing Module 110, and Decision Making Module 114. Alternatively the Processing Unit 101 can be operatively coupled to the functional modules, and configured to receive instructions therefrom and execute operations in accordance with the instructions.

The Monitoring Module 104 can be configured to monitor, in real time, one or more operations 102 of at least one computer program that runs concurrently in the live environment. It is to be noted that the term "operation" used in this specification should be expansively construed to include any kinds of actions performed by one or more processes, threads, applications, files or any other suitable entities in any operating system. By way of non-limiting example, in a Windows operating system, operations can be performed by one or more processes of the computer programs. For purpose of illustration only, references are made in part of the following description with respect to operations performed by one or more processes. Embodiments are, likewise, applicable to operations performed by any other suitable entities in any operating system as described above.

A process is an instance of a computer program that is being executed. A process can further create child processes, and a computer program can be associated with one or more processes. It should be noted that the term "program" used in this specification should be expansively construed to include any kind of system software (e.g., operating system, device drivers, etc.) and application software (e.g., office suites, media players, etc.) that perform specified tasks with a computer.

As aforementioned, Monitoring Module 104 can monitor all the operations (e.g., performed by processes or other entities) occurred in the live system environment. According to certain embodiments, the Monitoring Module 104 can further include two sub-components: an In-process Monitoring Module 107 and a Kernel Monitoring Module 109. The In-process Monitoring Module can monitor all in-process operations that are performed at process level and do not necessarily involve the kernel of an operating system. The Kernel Monitoring Module can monitor all operations that request services from an operating system's kernel, such as file system operations, process and memory operations, registry operations, and network operations, as further elaborated with respect to FIG. 2.

It is to be further noted that, without limiting the scope of the disclosure in any way, in some cases one operation can be construed to include a single action, such as "file read". In some other cases, one operation can also be construed to include a sequence of actions, for example, "file copy" can be regarded as one operation which includes a sequence of three sequential actions "file create", "file read", and "file write".

Event Parsing Module 106 can be configured to build at least one stateful model 108 in accordance with the one or more operations that are monitored by the Monitoring Module 104. According to certain embodiments, a stateful model is a data model with hierarchical structure that contains information indicative of a real time updated system state resulted from a sequence of operations performed in a live environment. The sequence of operations can be linked together by context. Thus the stateful model can be a logical representation (e.g., a tree structure, etc) of a sequence of linked operations. For instance, the stateful model 108 can include one or more objects derived from real time operations 102, and one or more relationships identified among the objects in accordance with the operations. According to certain embodiments, each of the objects of the stateful model 108 can represent an entity related in the operations and can be of a type selected from a group that includes: process object, file object, network object, registry object and windows object. The stateful model can further include attributes characterizing the objects and the identified relationships therein, as further elaborated with respect to FIGS. 3 and 4.

Behavior Analyzing Module 110 can be configured to analyze the stateful model 108 constructed by Event Parsing Module 106 to identify one or more behaviors. It should be noted that the term "behavior" used in this specification should be expansively construed to include any sequence of operations performed by one or more processes that fulfill one or more predefined behavioral logics (also termed as "behavioral signatures" hereinafter).

According to certain embodiments, the Malware Detection System 100 can further comprise a Storage Module 105 that comprises anon-transitory computer readable storage medium. The Storage Module 105 can include a Behavioral Signature Database 112 that is operatively coupled to the Behavior Analyzing Module 110 and stores the one or more predefined behavioral logics. According to certain embodiments, the predefined behavioral logics are behavioral signatures indicative of specific behavioral patterns. In some cases, the behavioral logics can be predefined based on prior knowledge of certain malware behaviors, such as, for instance, self-deletion, self-execution, and code injection, etc. Optionally, the predefined behavioral logics can also include one or more logics indicative of benign behaviors, as further elaborated with respect to FIG. 2. The stateful model 108 that is built by the Event Parsing Module 106 can also be stored in the Storage Module 105.

Decision Making Module 114 can be configured to determine the presence of malware based on the one or more behaviors identified by the Behavior Analyzing Module 110, as further elaborated with respect to FIG. 2.

According to certain embodiments, the Processing Unit 101 can further include a Mitigation Module 116 configured to eliminate the determined malware by remediating the one or more operations indicated by the stateful model.

According to further embodiments, the Malware Detection System 100 can further include an VO interface 103 communicatively coupled to the Processing Unit 101. The VO interface 103 can be configured to perform the following actions: receive instructions from end users and/or from one or more of the functional modules, and provide an output of processed information obtained from the functional modules, e.g., an illustration of the determined malware, to the end users.

According to certain embodiments, the Processing Unit 101 is further configured to perform at least one of the aforementioned operations of the functional components of the Malware Detection System 100 in realtime.

The operation of the Malware Detection System 100 and of the various components thereof is further detailed with reference to FIG. 2.

While not necessarily so, the process of operation of the Malware Detection System 100 can correspond to some or all of the stages of the method described with respect to FIG. 2. Likewise, the method described with respect to FIG. 2 and its possible implementations can be implemented by the Malware Detection System 100. It is therefore noted that embodiments discussed in relation to the method described with respect to FIG. 2 can also be implemented, mutatis mutandis as various embodiments of the Malware Detection System 100, and vice versa.

It should be further noted that the aforementioned functional components of the Malware Detection System 100 can be implemented in a stand-alone computer, such as the end user station. Or alternatively, one or more of the functional components can be distributed over several computers in different locations. In addition, the above referred modules can, in some cases, be cloud based.

Those versed in the art will readily appreciate that the teachings of the presently disclosed subject matter are not bound by the system illustrated in FIG. 1. Alternative to the example shown in FIG. 1, the Malware Detection System 100 can, in some cases, include fewer, more and/or different modules than shown in FIG. 1. Equivalent and/or modified functionality can be consolidated or divided in another manner and can be implemented in any appropriate combination of software, firmware and hardware.

Turning now to FIG. 2, there is shown a generalized flowchart of detecting malware in accordance with certain embodiments of the presently disclosed subject matter.

As illustrated in FIG. 2, one or more operations of at least one program that runs in a live environment can be monitored (202) in real time, e.g., by the Monitoring Module 104 of the Malware Detection System 100. As aforementioned, in contrast to a safe environment, a live environment should include one or more computer programs that are put into operation for their intended uses. The computer programs run concurrently and interactively (e.g., with other programs and/or end users) in the live environment. According to certain embodiments, one or more processes can be launched by the one or more programs. Each process can perform one or more operations in order to communicate with and/or request services from the operating system. Accordingly, the Monitoring Module 104 can be configured to monitor the one or more operations performed by each process.

Due to the large number of concurrently running programs and operations thereof in a live environment, the amount of information contained in the monitored operations can be huge. According to certain embodiments, the Monitoring Module 104 can be configured to select at least one operation of interest from the one or more operations, and monitor the selected at least one operation of interest.

According to certain embodiments, the at least one operation of interest includes one or more in-process operations and/or one or more kernel related operations. In-process operations can include any operation performed in user space (i.e., the memory area where application software executes) and do not necessarily involve the kernel of an operating system, such as, by way of non-limiting example, local process memory allocation, mapping functions from imported libraries, and read/write process memory. In some cases, the in-process operations can be monitored (e.g., by the In-process Monitoring module) by intercepting one or more library calls (e.g., API calls) that represent the corresponding operations. By way of non-limiting example, the In-process Monitoring module can attach monitoring hooks to the library calls in user space in order to monitor these calls.

The kernel related operations, on the other hand, can include one or more of the following operations that are performed in kernel space (i.e., the memory area reserved for running privileged kernel, kernel extensions, and most device drivers): file system operations, process and memory operations, registry operations, and network operations. Specifically, by way of non-limiting example, file system operations can include any operation and interaction with the storage medium of the host machine. Process and memory operations can include any operation of creating, terminating, modifying, querying, suspending and resuming processes, as well as memory management (e.g., allocating memory, creating a memory section, mapping/unmapping a memory section, writing/reading memory, etc). Registry operations can include any operation related to registry manipulation. And network operations can include any operation of sending or receiving data through network and network connection management.

The kernel related operations can be monitored by the Kernel Monitoring Module through different mechanisms, e.g., in accordance with different operating system platforms. For instance, for Mac OS X operating system, the kernel related operations can be monitored, by way of non-limiting example, by intercepting one or more system calls (in kernel space) that represent the corresponding operations. For the Windows operating system, kernel related operations can be monitored, by way of non-limiting example, by registering one or more kernel filter drivers for the kernel related operations via one or more callback functions. Windows operating system allows new drivers to be registered as part of the existing kernel stack, and thus information regarding a specific type of operation can be filtered by a corresponding kernel filter driver and passed through to the Kernel Monitoring Module via callback functions.

According to certain embodiments, OOB (Out-of-Band) monitoring approach can be adapted in the monitoring process (e.g., by the Kernel Monitoring Module). OOB enables the monitoring module to get notified on selected operations/events while not to have control over these operations/events, which allows the monitoring module to utilize different monitoring mechanisms (e.g., kernel callback functions) to accomplish a full system monitoring in an optimized manner. OOB also allows the events to be processed and analyzed into a stateful model in real time while the events are happening, as further described below.

According to certain embodiments, OOB can also enable the sequence of operations described with reference to FIG. 2, e.g., the monitoring operations, building stateful model, analyzing behaviors, determining malware and eliminating the determined malware, to be performed in the same machine, such as an end user station.

It is to be noted that the aforementioned categorized operations that are monitored respectively by different monitoring modules are provided for exemplary purposes only and should not be construed as limiting. For instance, in some cases one or more of the operations monitored by the In-process Monitoring Module can also be monitored by the Kernel Monitoring Module, and vice versa. According to one embodiment, at least one of the kernel related operations can be only monitored by the kernel Monitoring Module.

It should be noted that above mentioned examples of operations and implementations of the monitoring mechanisms are illustrated for exemplary purposes only. Additional kinds of operations and implementations can be applied in addition to or instead of the above.

It is also noted that the implementation mechanisms of the Kernel Monitoring Module can expedite system processing and enable the monitoring of the operations to be performed in a real time manner in a live environment.

According to certain embodiments, each monitored operation of the one or more operations constitutes an event. The Monitoring Module 104 can be further configured to generate event data characterizing one or more events. Optionally, an event data can be generated to characterize a respective event. According to certain embodiments, the event data can include at least the following attributes of the respective event: operation type, and source of the event.

Specifically, operation type is an identifier indicative of the type of the monitored operation that constitutes the event. The source of an event is the originating entity that performs the operation. Optionally, event data can include one or more additional attributes. For example, in some cases event data can include a target of an event, such as a targeting process, a targeting file, or any other entities that the operation is performed upon by the source of the event. In some further cases, event data can also include additional attributes according to different types of operations. For instance, event data that characterize file system operations can include additional attributes such as file permissions, full path of the file, size of the file, etc, while event data that characterize process and memory operations can include additional attributes such as address of the memory on which the operation is performed, size of the data that was written or read, memory permissions, etc.

Following step 202, at least one stateful model can be built (204) in accordance with the one or more operations, e.g., by the Event Parsing Module 106 of the Malware Detection System 100, as further described below in detail with respect to FIG. 3.

Attention is now directed to FIG. 3, illustrating a generalized flowchart of building a stateful model in accordance with certain embodiments of the presently disclosed subject matter. According to certain embodiments, the event data generated by the Monitoring Module 104 is created based on a large amount of raw data gathered through different routes, e.g., low level system calls and kernel driver callbacks, etc, thus the event data are generated in various forms. According to certain embodiments, this raw form of event data can be normalized (302) by the Event Parsing Module 106 into a logical data structure, giving rise to an abstract event which allows each segment of the attributes encoded in the event data to be accessed and analyzed. Specifically, the Event Parsing Module 106 can format the event data and parse the formatted event data in order to generate the abstract event. Through the event data normalization, event data indicative of similar operations but generated in various forms can also be normalized into a single format and categorized into the same event type. For example, various system API calls generated to allocate memory will be categorized into a single type of abstract event, e.g., a memory allocation event.

According to certain embodiments, the Event Parsing Module 106 can select event data associated with events of interest from all event data received from the Monitoring Module 104 based on one or more predefined filtering rules, and apply the normalization with respect to the selected event data. By way of non-limiting example, the one or more predefined filtering rules can include filtering out event data associated with the following events: uncompleted events, memory related events in which the targeting process is not a remote process, and events in which the targeting process does not exist.

Based on the generated abstract event, a stateful model can be created or updated. As aforementioned, a stateful model can be a logical structure representation of a sequence of linked operations performed in a live environment.

According to certain embodiments, for each event data that is normalized to an abstract event, one or more objects can be retrieved (304) from the abstract event. As aforementioned, each of the retrieved objects represents an entity related in a corresponding event, and each object can be of a type selected from a group that includes: process object, file object, network object, registry object, and windows object. At least one of the objects represents the source of the event that performs a corresponding operation. By way of non-limiting example, the source of the event can be represented by a process object indicating an originating process that performs the operation. For example, a process P1 performs an operation of "system shutdown". In this case, a process object will be retrieved from the corresponding abstract event to represent P1 as the source of the event.

In some cases an operation is performed upon a target entity (i.e. target of the event) by the source of the event. For example, a process P1 opens a file F1. A process object will be retrieved from the corresponding abstract event to represent P1 as the source of the event for the operation "file open", and a file object will be retrieved to represent F1 as the target of the event.

It is to be noted that an operation is usually initiated by a process. Thus the source of an event is normally represented by a process object. The target of the event, however, can be of various types of objects that are manipulated in the operation, such as a process object, file object, network object, registry object, etc.

According to further embodiments, a process can own resources, such as a source file that the process is initiated from. The source file can be of various types, such as, by way of non-limiting example, a document file, an image file that contains the executable program that the process is launched from, or any other relevant types of files. A source file, if related to an operation, can also be represented by a file object.

It is to be noted that the above mentioned object types are merely illustrated for exemplary purposes only and should not be construed as limiting the present disclosure in any way. Additional types of objects that may occur in an operation can be included in addition to or instead of the above.

Following retrieving the objects from an abstract event in step 304, the Event Parsing Module 106 can identify one or more relationships (306) among the objects in accordance with the abstract event, and generate respective associations among the objects corresponding to the identified relationships, giving rise to an event context corresponding to the abstract event. The event context contains context information of the corresponding event, and comprises the one or more objects of the event and the associations therein.

Following step 306, the Event Parsing Module 106 can further determine if a current event is a first event (308) of a stateful model, as described below in detail with respect to FIG. 4a. In case of the above condition being met, a new stateful model can be generated (310) and include the event context, namely, the one or more objects and the one or more associations therein. The process then goes back to step 302 wherein the next event data can be processed.

Figure 4B:
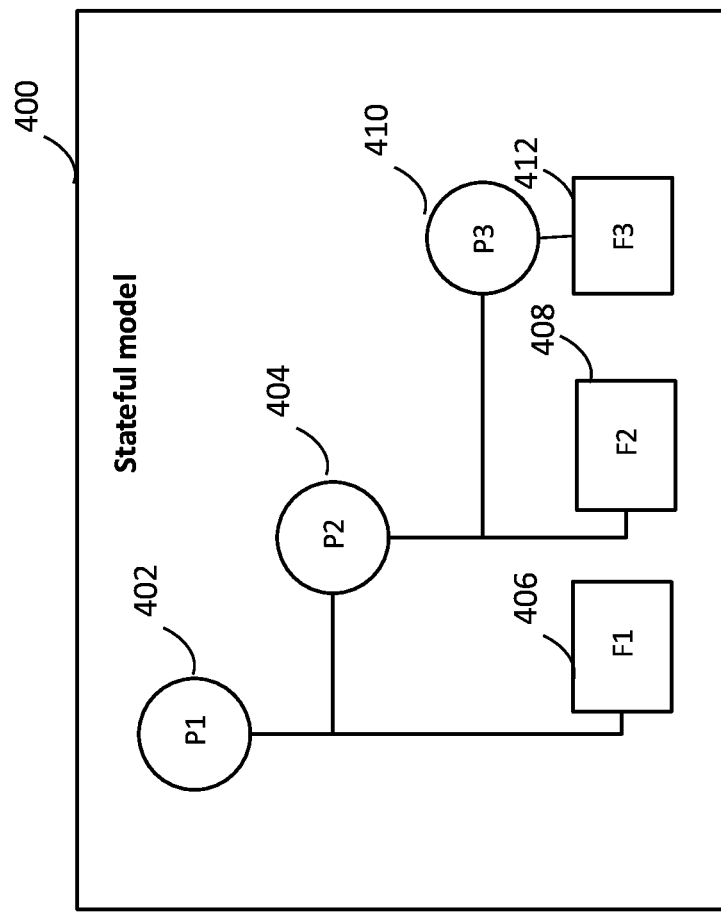
FIGS. 4a and 4b are schematic illustrations of an exemplified stateful model and an exemplified updated stateful model in accordance with certain embodiments of the presently disclosed subject matter.
Figure 4A:
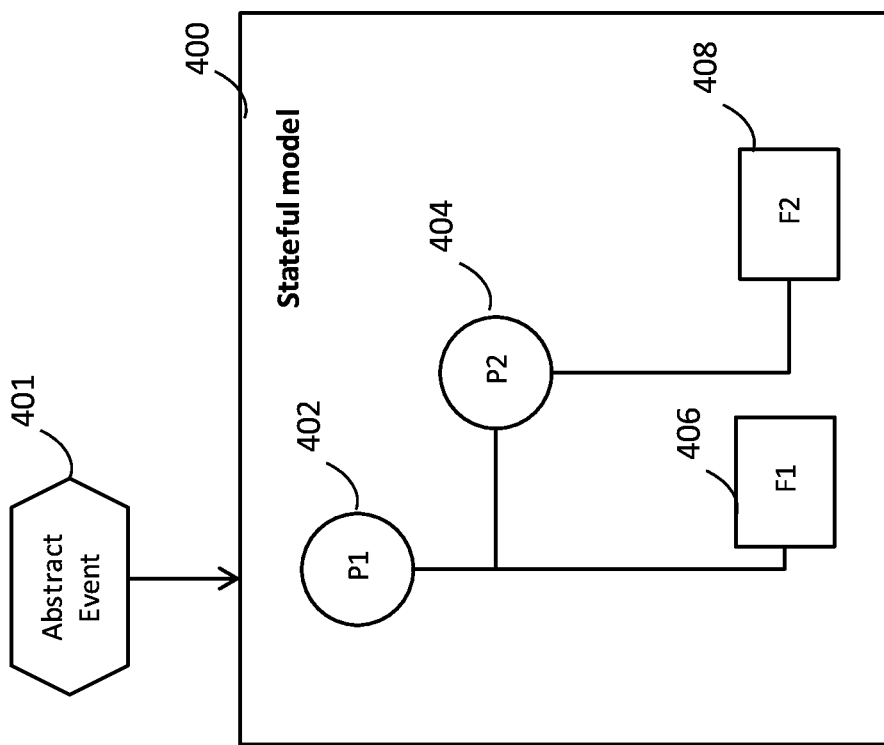

With reference now to FIG. 4a, there is shown an exemplified stateful model 400 being created based on an abstract event 401, in accordance with certain embodiments of the presently disclosed subject matter. Abstract event 401 is normalized from an event data characterizing an event E1 of a process P1 creating a child process P2. The abstract event 401 comprises the following attributes of the event: operation type—process creation; source of the event—P1 (as the originating process of the event), source file of P1-F1, target of the event—P2 (as a targeting process of the event), and source file of tP2-F2. Based on the abstract event 401, four objects can be retrieved: a process object 402 indicative of the source of the event P1, a process object 404 indicative of the target of the event P2, a file object 406 indicative of the source file F1 of P1, and a file object 408 indicative of the source file F2 of P2. According to certain embodiments, file objects 406 and 408 can be affiliated with, or correlated with, their respective process objects 402 and 404 as illustrated. The abstract data 401 can further include additional attributes which contain more information of the operation if applicable.

A relationship indicative of process creation can be identified between process objects 402 and 404 in accordance with the abstract event. A corresponding association between 402 and 404 can be generated accordingly based on the identified relationship, giving rise to an event context that comprises the process objects 402 and 404 (together with their correlated file objects 406 and 408) and the association therebetween. The association can be represented, e.g., as a direct linkage between the two related objects 402 and 404, as illustrated in FIG. 4a.

According to certain embodiments, one or more fields can be created for each of the objects, storing one or more parameters characterizing the respective object and the association related thereto. By way of non-limiting example, the process object 402 can have one or more fields selected from a group that includes: process identifier (e.g., a unique identifier assigned by the operating system for each process), one or more source file identifiers (e.g., a pointer to file object 406), and one or more operations and corresponding associations related thereto (e.g., an operation of process creation and a corresponding linkage to P2). The file object 406 can have one or more of fields selected from a group that includes: file identifier (e.g., the full path of the file), process identifier, and one or more operations and corresponding associations related thereto. Assume that E1 is a first event in a stateful model, a stateful model 400 can be generated and include the event context of E1.

It should be noted that the term "stateful model" should be expansively construed to include any of the following situations:

1) A stateful model can be a program-level stateful model that represents a sequence of linked operations related to a given program (and in some cases, also operations related to one or more other programs that are linked to the given program due to operations). In this case, a stateful model represents a program context that reflects all the operations related to the given program by context.

A first event of the program-level stateful model can be determined to be any event that relates to the given program's first interaction with the system. For instance, a first event can be determined to be an event of "process creation" that creates the initiating process of the given program. An initiating process is the process that is created upon the given program being executed, which may also be the root process of a stateful model that performs further operations. A first event can also be determined to be an event performed by the initiating process upon other objects.

In the above example illustrated in FIG. 4a, if the originating process P1 is the initiating process of a certain program, the creation of P1 can be determined as the first event in the stateful model. Since the initiating process may be created by a system process P0, in some cases the stateful model can include P0, P1 and the association of process creation between P0 and P1. In some other cases the stateful model may include only the object P1, and a reference therewith indicating that P0 is the parent of P1. In some further cases a first event can also be determined as an event that P1 performs on other objects, for example, an event of "process creation" performed by P1 to create a child process P2.

In some circumstances events can be delayed to be processed by the Event Parsing Module 106 due to unexpected system processing problems. Thus a first event of the stateful model can also be an event that does not occur first in terms of time, but is first processed by the Event Parsing Module 106. Accordingly, following the above mentioned example of FIG. 4a, if a further event E2 of P2 opening a file F1 is first processed by the Event Parsing Module 106, the event E2 can be determined to be a first event of the stateful model, and any event that occurs before it (e.g., the event E1 of P1 creating P2) can be processed retroactively and reflected in the stateful model.

Thus, depending on the number of programs concurrently running in the live environment and the operational relationships among them, there may be one or more program stateful models co-existing, each of which represents a respective program context of a given program;

2) A stateful model can be a system-level stateful model that represents operations related to all programs that run concurrently in a live environment. In this case a first event of the stateful model can be determined to be the event of "system start" that is initiated when the operating system initially starts. Accordingly, there is only one stateful model existing at any given time in the system which represents a system context of the entire environment. According to some embodiments, the system-level stateful model can be created upon the initialization of the operating system, and can be kept updating while the operating system and program processing proceeds. In accordance with further embodiments, the system-level stateful model may be created by including one or more program-level stateful models each related to one program of all the programs running in the live environment as described above.

It is to be noted that the definition and implementation of the above stateful model structure are illustrated for exemplary purposes only and should not be construed as limiting the present disclosure in any way. Alternative data structures can be applied to implement equivalent functionality of the stateful model in addition to or in lieu of the above.

Turning back to FIG. 3, according to certain embodiments, if the current event is not a first event of a stateful model (308), a previous stateful model corresponding to at least one previous event that precedes the current event exists. The Event Parsing Module 106 can update (312) the previous stateful model based on the event context of the current event, giving rise to an updated stateful model that is updated.

According to certain embodiments, a previous stateful model can be updated in accordance with the following scenarios:

1) If all the objects of the current event are already included in the previous stateful model, the one or more associations of the event context can be added to the previous stateful model, giving rise to the updated stateful model;
2) Otherwise at least one object of the one or more objects should be a new object that does not exist in the previous stateful model. Thus the new object, together with the one or more associations, can be added to the previous stateful model, giving rise to the updated stateful model.

Continuing with the example illustrated in FIG. 4a, assume that the illustrated stateful model 400 (including process objects P1, P2 and the association between P1 and P2 representing the event E1 of P1 creating P2) is a previous stateful model that exists, and a current event E2 arrives, wherein the same process P1 allocates memory in the same child process P2. Following the process in FIG. 3, the event data that characterizes the current event E2 is normalized to an abstract event. Objects P1 and P2 are retrieved based on the abstract event. A relationship indicative of memory allocation can be identified between P1 and P2 based on the abstract event, and an association between P1 and P2 can be generated based on the identified relationship. Thus an event context for the current event E2 comprises objects P1 and P2 and the association therebetween. Since the current event E2 is not a first event in the previous stateful model 400, the stateful model 400 will be updated based on the current event context. In this case, since all the objects of the current event, namely, P1 and P2, are already included in the previous stateful model 400, the currently generated association between P1 and P2 representing an operation of memory allocation, will be added as a new association between P1 and P2 in the stateful model 400, besides the previous association therebetween representing the operation of process creation, giving rise to an updated stateful model. By way of non-limiting example, the new association can be added in the stateful model by adding a respective field for P1 and/or P2 to indicate the operation of memory allocation therebetween. Since only the association has been updated, the hierarchical structure of the updated stateful model may look similar as illustrated in FIG. 4a, with a newly added association.

Continuing with the same example, assume that another event E3 arrives after E2, wherein the process P2 creates a child process P3. Following the same process in FIG. 3, the event data that characterizes the current event E3 is normalized to an abstract event. Objects P2 and P3 are retrieved based on the abstract event. A relationship indicative of process creation can be identified between P2 and P3 based on the abstract event, and an association between P2 and P3 can be generated based on the identified relationship. Thus an event context for the current event E3 comprises objects P2 and P3 and the association therebetween. Since the current event E3 is not the first event in the stateful model 400, the stateful model 400 will be updated based on the current event context. In this case, since P3 is a new object that does not exist in the previous stateful model, the new object P3 can be added to the stateful model 400 as a process object 410. Optionally a file object F3 that is correlated with P3 can also be added as a file object 412. The association between P2 and the new object P3 can be added in the stateful model, by way of non-limiting example, by adding a respective field for P2 and/or P3 to indicate the operation of process creation therebetween, giving rise to an updated stateful model, as illustrated in FIG. 4b.

It is to be noted that the specific examples of building and updating the stateful model illustrated above are provided for exemplary purposes only and should not be construed as limiting. Accordingly, other ways of implementation of building and updating the stateful model can be used in addition to or in lieu of the above.

It should also be noted that the present disclosure is not bound by the specific sequence of operation steps described with reference to FIG. 3.

Having described the structure of the stateful model and the process of building/updating the stateful model in accordance with certain embodiments, attention is now drawn back to FIG. 2, wherein analyzing at least one stateful model in order to identify one or more behaviors is now described with reference to step 206.

According to certain embodiments, the Behavior Analyzing Module 110 can be further configured to analyze the event context of the current event in view of the stateful model (when the stateful model is newly created based on the current event) or the updated stateful model (when the stateful model is updated based on the current event), in accordance with one or more predefined behavioral logics.

The Behavior Analyzing Module 110 can further determine the presence of at least one behavior upon any of the one or more predefined behavioral logics being met. The determined behavior relates to a sequence of events of the stateful model including at least the current event. In some cases, each of the sequence of events independently may not be identified as malicious, but when considered within the sequence context, is actually performing a malicious behavior. By analyzing the event context in view of the stateful model, the Behavior Analyzing Module can inspect a specific event while looking at the whole picture, thus avoiding omission of undetected malwares.

According to certain embodiments, the predefined behavioral logics are behavioral signatures indicative of specific behavioral patterns. The behavioral logics can be predefined based on prior knowledge of certain malware behaviors, such as, for instance, self-deletion, self-execution, and code injection, etc. The behavioral logics can be stored in a Behavioral Signature Database 112 as aforementioned with respect to FIG. 1. One of the predefined behavioral logics can be, by way of non-limiting example, determining a behavior of self-execution when the following condition is met: the target of an event is an object that is already included in the stateful model, which indicates that the operation is performed on one of the family's own members. For example, a targeting process of an event is identical to one of the following: the originating process, a child process of the originating process, and a parent process of the originating process. Another similar exemplary behavioral logic can be, for instance, determining a behavior of self-deletion when the following condition is met: the target of a deletion event is an object included in the stateful model. For example, the source file of a targeting process of an event is identical to one of the following: the source file of the originating process, and the source file of a parent process of the originating process.

Optionally, the predefined behavioral logics can also include one or more logics indicative of benign behavior patterns such as, for example, interaction with the desktop or users, registration in the system program repository, etc. According to certain embodiments, each behavioral signature in the database can be associated with a predefined behavioral score that indicates the malicious level of a corresponding behavior. Accordingly each of the determined at least one behavior can be assigned with a respective behavioral score based on the predefined behavioral score associated therewith. The process of analyzing a stateful model and determining at least one behavior is further exemplified with reference to FIG. 5.

It is to be noted that the hierarchical structure of the stateful model as described above is designed as a fast accessible data structure, which can in turn enable the creating of the stateful model and analyzing the created stateful model, following the monitoring of the operations, to be performed in a real time manner in a live environment.

Upon the at least one behavior being determined, the Decision Making Module 114 can be configured to determine the presence of malware (208) based on the determined behavior. According to certain embodiments, each stateful model can be associated with a stateful model score. The stateful model score is an aggregated behavioral score of all behavioral scores assigned for respective behaviors being determined in the stateful model. Upon at least one current behavior being determined in a stateful model, the Decision Making Module 114 can search if there is a previous stateful model score associated with a previous stateful model. Accordingly, the previous stateful model score is an aggregated behavioral score of all previous behavioral scores assigned for respective previous determined behaviors, the previous determined behaviors being related to the at least one previous event of the previous stateful model. If there is no previous stateful model score, the sum of the respective behavioral score for each of the at least one behavior can be determined as the stateful model score associated with the current stateful model. Otherwise, if there is found a previous stateful model score, the previous stateful model score can be increased with the sum, giving rise to the stateful model score that has been updated based on the current event. The Decision Making Module 114 can be further configured to compare the stateful model score with a predefined threshold. The predefined threshold can be a score indicative of malware presence and can be predetermined based on prior knowledge of malware detection. If the stateful model score passes the predefined threshold, a presence of malware can be determined. For example, the corresponding stateful model, and one or more programs that relate to the stateful model can be determined as malicious. The process of determining the presence of malware is further exemplified with reference to FIG. 5.

According to certain embodiments, the respective behavioral score of a currently determined behavior can be assigned with a corresponding weight factor if a condition is met. The condition can be, by way of non-limiting example, that the source of an event is a remote process and the target of the event is a system process, indicating that a remote process is performing operations on a system process. In this case a weight factor (e.g., a numerical value greater than 1) can be assigned to the original behavioral score associated with this behavior, indicating an increasing likelihood of malware presence. The assigned weight factor can be applied to the original behavioral score (e.g., by multiplying the original behavioral score with the weight factor), giving rise to a weighted behavioral score. Accordingly the previous stateful model score can be increased with a sum of the weighted behavioral score assigned for each of the at least one behavior.

It is to be noted that the present disclosure is not bound by the specific scoring and weighting paradigms described above. The scoring and weighting functionalities can be implemented in a consolidated manner or separately. Additional kinds of implementations can be applied in addition or instead of the above.

According to certain embodiments, the determined malware can be eliminated by remediating the operations indicated in the stateful model, such as, by way of non-limiting example, by terminating the process objects within the stateful model, removing the file objects (or other types of objects) correlated with or created by the process objects, and undo the operations performed among the objects if possible, in order to restore the system to a state as close as possible to the system state before the operations in the stateful model were executed. According to further embodiments, an output of the determined malware can be provided through the I/O Interface 103 to the end users, as aforementioned.

According to certain embodiments, the sequence of operations described with reference to FIG. 2, e.g., the monitoring operations, building stateful model, analyzing behaviors, determining malware and eliminating the determined malware, can be carried out concurrently in real time. For instance, building at least one stateful model in accordance with the one or more operations responsive to monitoring the one or more operations of at least one program concurrently running in a live environment can be performed in real time. Additionally or alternatively, analyzing the at least one stateful model to identify one or more behaviors responsive to monitoring the one or more operations and building the at least one stateful model can be performed in real time. Additionally or alternatively, determining the presence of malware based on the identified one or more behaviors responsive to analyzing the at least one stateful model can be performed in real time. Additionally or alternatively, eliminating the determined malware responsive to determining the presence of malware can be performed in real time.

It is to be noted that the present disclosure is not bound by the specific sequence of operation steps described with reference to FIG. 2.

Figure 5:
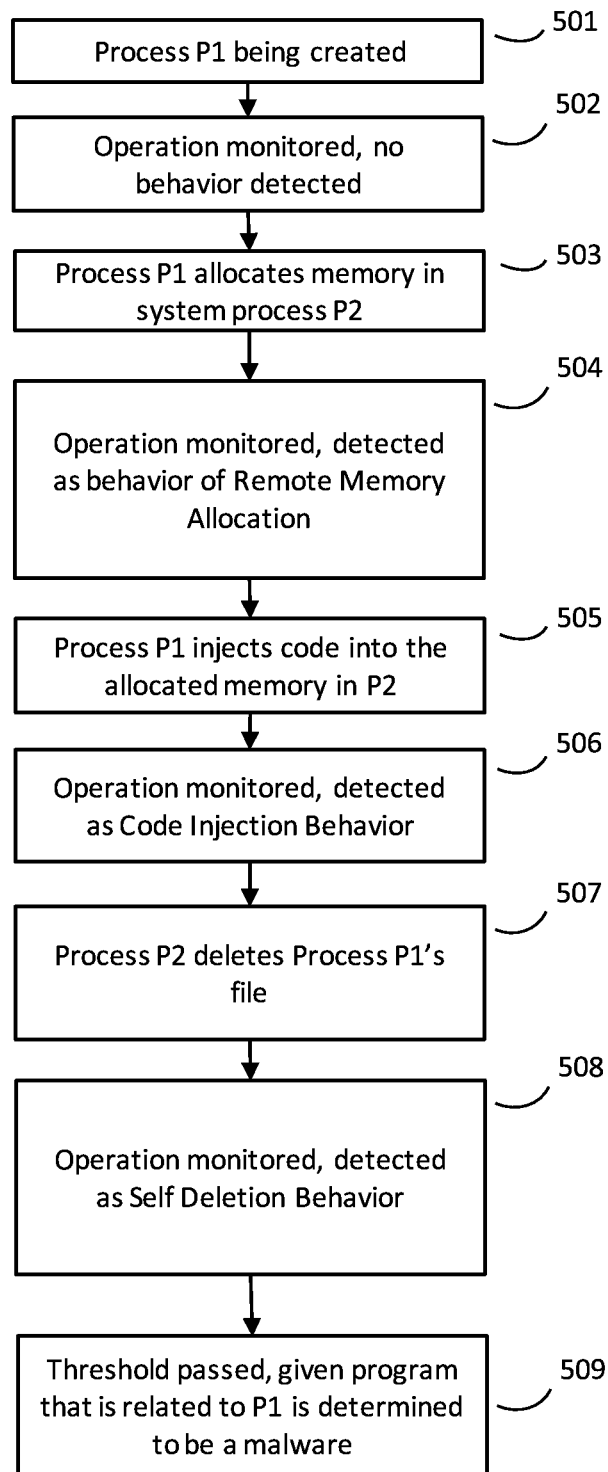
FIG. 5 is a generalized flowchart of an exemplified sequence of operations being monitored and processed in accordance with certain embodiments of the presently disclosed subject matter.

Turning now to FIG. 5, there is shown a generalized flowchart of an exemplified sequence of operations being monitored and processed in accordance with certain embodiments of the presently disclosed subject matter.

As shown, a process P1 is created (501) upon a given program being executed. Thus P1 is the initiating process of the given program. The operation of process creation is monitored, e.g., by the kernel monitoring module. A corresponding event E1 and event data thereof are generated accordingly. E1 is determined to be the first event of a stateful model, and the stateful model is generated based on E1. The stateful model will now include an event context of E1, namely, P1 (optionally, also a system process P0 that creates P1, and/or the source file F1 of P1), together with an association of process creation of P1. No behavior is determined (502) at this stage in accordance with the predefined behavioral logics, and, accordingly no score is assigned.

A second operation of P1 allocating memory to a system process P2 (503) occurs. The operation of memory allocation is monitored, e.g., by the in-process monitoring module.

A corresponding event E2 and event data thereof are generated accordingly. Since E2 is not the first event of a stateful model, the previous stateful model comprising event context E1 is updated based on E2. The stateful model now includes P1, P2 (optionally also their source files F1 and F2) together with an association of memory allocation between P1 and P2. A behavior of remote memory allocation is determined (504) in accordance with one of the predefined behavioral logics, and accordingly a behavioral score S1 is assigned. Since there is no previous stateful model score, the behavioral score S1 is also the stateful model score.

Following the second operation, a third operation of P1 injecting code (505) in the allocated memory in P2 occurs. According to certain embodiments, the operation of code injection can comprise three actions: memory write, memory execution permissions, and code execution, all of which are monitored. A corresponding event E3 and event data thereof are generated accordingly. Since E3 is not the first event of a stateful model, the previous stateful model based on event context of E1 and E2 are further updated based on the current event E3. The stateful model now includes P1, P2 (optionally also their source files F1 and F2), a previous association of memory allocation between P1 and P2, and a new association of code injection between P1 and P2. A behavior of code injection is determined (506) in accordance with one of the predefined behavioral logics, and accordingly a behavioral score S2 is assigned. The stateful model score is updated to be the sum of S1 and S2.

A fourth operation of P2 deleting P1's file F1 (507) follows the third operation. The operation of file deletion is monitored. A corresponding event E4 and event data thereof are generated accordingly. Since E4 is not the first event of a stateful model, the previous stateful model based on previous events E1, E2 and E3 are now updated based on E4. The present stateful model includes P1, P2, F1 (optionally also source file F2), two associations (i.e. memory allocation, and code injection) between P1 and P2, and a new association of file deletion between P2 and F1. Based on analyzing the stateful model, it is noted that P1 is actually the parent of P2. A behavior of self-deletion is determined (508) in accordance with one of the predefined behavioral logics, and a behavioral score S3 is assigned. Now the stateful model score is updated to be the sum of S1, S2 and S3. If the stateful model score passes a predefined threshold, the presence of malware is determined. For example, the stateful model, especially the given program that is related to P1 is determined to be malicious, and will be eliminated (509). For instance, the process objects P1 and P2 are terminated, the file objects F1 and F2 are removed, and the relevant operations between P1 and P2, such as memory allocation, code injection, file deletion etc, can be remediated if possible.

It is to be noted that the specific examples illustrated above with reference to FIG. 5 are provided for exemplary purposes only and should not be construed as limiting the present disclosure in any way.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A computer-implemented method of performing a behavior-based analysis of an execution of a program in an operating system, the method comprising:

monitoring, by a computer system, by registering one or more kernel filter drivers for kernel space operations via one or more call back functions using an out-of-band monitoring module, one or more operations performed by the execution of the program running in the operating system in a live environment, wherein the monitoring comprises tracking user space operations and the kernel space operations;

generating, by the computer system, an event data for each of the one or more monitored operations;

normalizing the event data into a logical data structure such that attributes of the event data can accessed and analyzed;

building, by the computer system, at least one stateful model of the execution of the program based on the normalized event data, the at least one stateful model comprising a hierarchal structure of the one or more monitored operations performed by the execution of the program in the live environment, the one or more monitored operations linked by an event context, wherein the hierarchal structure comprises:

the event context comprising:

one or more objects derived from the one or more monitored operations;

one or more fields generated for each of the one or more objects, the one or more fields storing one or more parameters characterizing a respective object of the one or more objects and an associate to the respective object; and one or more relationships identified among the one or more objects; and attributes characterizing the one or more objects and the one or more relationships among the one or more objects, wherein the attributes comprise at least a type of the one or more monitored operations and a source of the one or more events;

analyzing, by the computer system, the event context to identify one or more behaviors of the execution of the program related to the one or more events; and applying a score to the stateful model based on the one or more identified behaviors, wherein applying the score to the stateful model comprises:

determining a weighted behavior score for each of the one or more identified behaviors, wherein the weighted behavior score indicates a likelihood of the presence of malware based on the one or more identified behaviors;

determining the score by computing a sum of the weighted behavior scores for each of the one or more identified behaviors; and comparing the one or more identified behaviors and the score to one or more pre-existing behaviors and a pre-existing score of a pre-existing stateful model.

2. The computer-implemented method of claim 1, further comprising updating, in real time, the at least one stateful model in response to one or more new events.

3. The computer-implemented method of claim 1, further comprising outputting, via an output device of the computer system, a representation of the one or more identified behaviors of the execution of the program.

4. The computer-implemented method of claim 1, further comprising storing the one or more identified behaviors of the execution of the program in a behavioral profile database.

5. The computer-implemented method of claim 1, wherein the computer system comprises a cloud-based computer system.

6. The computer-implemented method of claim 1, wherein the computer system comprises one or more functional components distributed over more than one computer.

7. The computer-implemented method of claim 1, wherein the live environment comprises one or more programs, including the program, operating concurrently and interactively for their intended uses.

8. The computer-implemented method of claim 1, further comprising aggregating the one or more identified behaviors.

9. The computer-implemented method of claim 1, wherein the one or more behaviors comprise a representation of a behavior pattern of the execution of the program.

10. The computer-implemented method of claim 1, further comprising analyzing the one or more behaviors to determine if the execution of the program comprises malware.

11. A system for performing a behavior-based analysis of an execution of a program in an operating system, the system comprising:
one or more computer readable storage devices configured to store a plurality of computer executable instructions; and
one or more hardware computer processors in communication with the one or more computer readable storage devices and configured to execute the plurality of computer executable instructions in order to cause the system to:
monitor, by registering one or more kernel filter drivers for kernel space operations via one or more call back functions using an out-of-band monitoring module, one or more operations performed by the execution of the program running in the operating system in a live environment, wherein monitoring comprises tracking user space operations and the kernel space operations;
generate an event data for each of the one or more operations of interest, wherein the event data characterizes one or more events of the one or more monitored operations;
normalize the event data into a logical data structure such that attributes of the event data can accessed and analyzed;
build at least one stateful model of the execution of the program based on the normalized event data, the at least one stateful model comprising a hierarchal structure of the one or more monitored operations by the execution of the program in the live environment, the one or more monitored operations linked by an event context, wherein the at least one stateful model comprises:
the event context comprising:
one or more objects derived from the one or more monitored operations;
one or more fields generated for each of the one or more objects, the one or more fields storing one or more parameters characterizing a respective object of the one or more objects and an associate to the respective object; and
one or more relationships identified among the one or more objects; and
attributes characterizing the one or more objects and the one or more relationships among the one or more objects, wherein the attributes comprise at least a type of the one or more monitored operations and a source of the one or more events;
analyze the event context to identify one or more behaviors of the execution of the program related to the one or more events; and
apply a score to the stateful model based on the one or more identified behaviors, wherein applying the score to the stateful model comprises:
determining a weighted behavior score for each of the one or more identified behaviors, wherein the weighted behavior score indicates a likelihood of the presence of malware based on the one or more identified behaviors; and
determining the score by computing a sum of the weighted behavior scores for each of the one or more identified behaviors; and
compare the one or more identified behaviors and the score to one or more pre-existing behaviors and a pre-existing score of a pre-existing stateful model.

12. The system of claim 11, wherein the system is further caused to update, in real time, the at least one stateful model in response to one or more new events.

13. The system of claim 11, wherein the system is further caused to output, via an output device of the system, a representation of the one of more behaviors of the execution of the program.

14. The system of claim 11, wherein the system is further caused to store the one or more behaviors of the execution of the program in a behavioral profile database.

15. The system of claim 11, wherein the system comprises a cloud-based computer system.

16. The system of claim 11, wherein the system comprises one or more functional components distributed over more than one computer.

17. The system of claim 11, wherein the live environment comprises one or more programs, including the program, operating for concurrently and interactively for their intended uses.

18. The system of claim 11, wherein the system is further caused to aggregate the one or more identified behaviors.

19. The system of claim 11, wherein the one or more behaviors comprise a representation of a behavior pattern of the execution of the program.

20. The system of claim 11, wherein the system is further caused to analyze the one or more behaviors to determine if the execution of the program comprises malware.

* * * * *